US010570818B2

United States Patent
Melde-Tuczai et al.

(10) Patent No.: US 10,570,818 B2
(45) Date of Patent: Feb. 25, 2020

(54) LONGITUDINALLY ADJUSTABLE CONNECTING ROD

(71) Applicant: AVL LIST GMBH, Graz (AT)

(72) Inventors: Helmut Melde-Tuczai, Graz (AT); Stefan Lichtenegger, St. Stefan ob Stainz (AT); Gerhard Heimel, Graz (AT); Bernhard Hoedl, Graz (AT)

(73) Assignee: AVL LIST GMBH, Graz (AT)

( * ) Notice: Subject to any disclaimer, the term of this patent is extended or adjusted under 35 U.S.C. 154(b) by 0 days.

(21) Appl. No.: 15/737,423

(22) PCT Filed: Jun. 20, 2016

(86) PCT No.: PCT/EP2016/064193
§ 371 (c)(1),
(2) Date: Apr. 30, 2018

(87) PCT Pub. No.: WO2016/203047
PCT Pub. Date: Dec. 22, 2016

(65) Prior Publication Data
US 2018/0266313 A1    Sep. 20, 2018

(30) Foreign Application Priority Data

Jun. 18, 2015 (AT) ............................... A 50511/2015
Apr. 29, 2016 (AT) ............................... A 50389/2016

(51) Int. Cl.
*F02B 75/04* (2006.01)
*F16K 11/18* (2006.01)
(Continued)

(52) U.S. Cl.
CPC .......... *F02B 75/045* (2013.01); *F16K 11/048* (2013.01); *F16K 11/056* (2013.01);
(Continued)

(58) Field of Classification Search
CPC ........ F02B 75/045; F02D 15/00; F02D 15/02; F16C 7/04; F16C 7/06; F16C 2360/22; F16K 11/18; F16K 11/048; F16K 11/056
See application file for complete search history.

(56) References Cited

U.S. PATENT DOCUMENTS 2,989,954 A * 6/1961 Hulbert .................. F02B 75/04
                                               123/48 B
4,124,002 A * 11/1978 Crise ..................... F02B 75/045
                                               123/78 E
(Continued)

FOREIGN PATENT DOCUMENTS

AT        511803        3/2013
AT        514071        10/2014
(Continued)

OTHER PUBLICATIONS

Decision to Grant for Austria Patent Application No. 50511/2015, dated Aug. 18, 2016, 2 pages.
(Continued)

*Primary Examiner* — Grant Moubry
(74) *Attorney, Agent, or Firm* — Sheridan Ross P.C.

(57) ABSTRACT

A length-adjustable connecting rod has a first rod part and a second rod part, with the rod parts being displaceable telescopically toward and/or in one another by means of a length-adjusting means, and with the length-adjusting means being chargeable via a hydraulic channel with a hydraulic medium. The hydraulic channel is fluidly connectable by means of a control device to a hydraulic medium supply channel. The control device has a first and a second valve, each with a valve chamber and each with a valve body that can be pressed by a restorative force against a valve seat. The valve chamber of the first valve is fluidly connected to a first hydraulic channel, and the second valve chamber of the second valve to a second hydraulic channel. The valve
(Continued)

Figure 3:
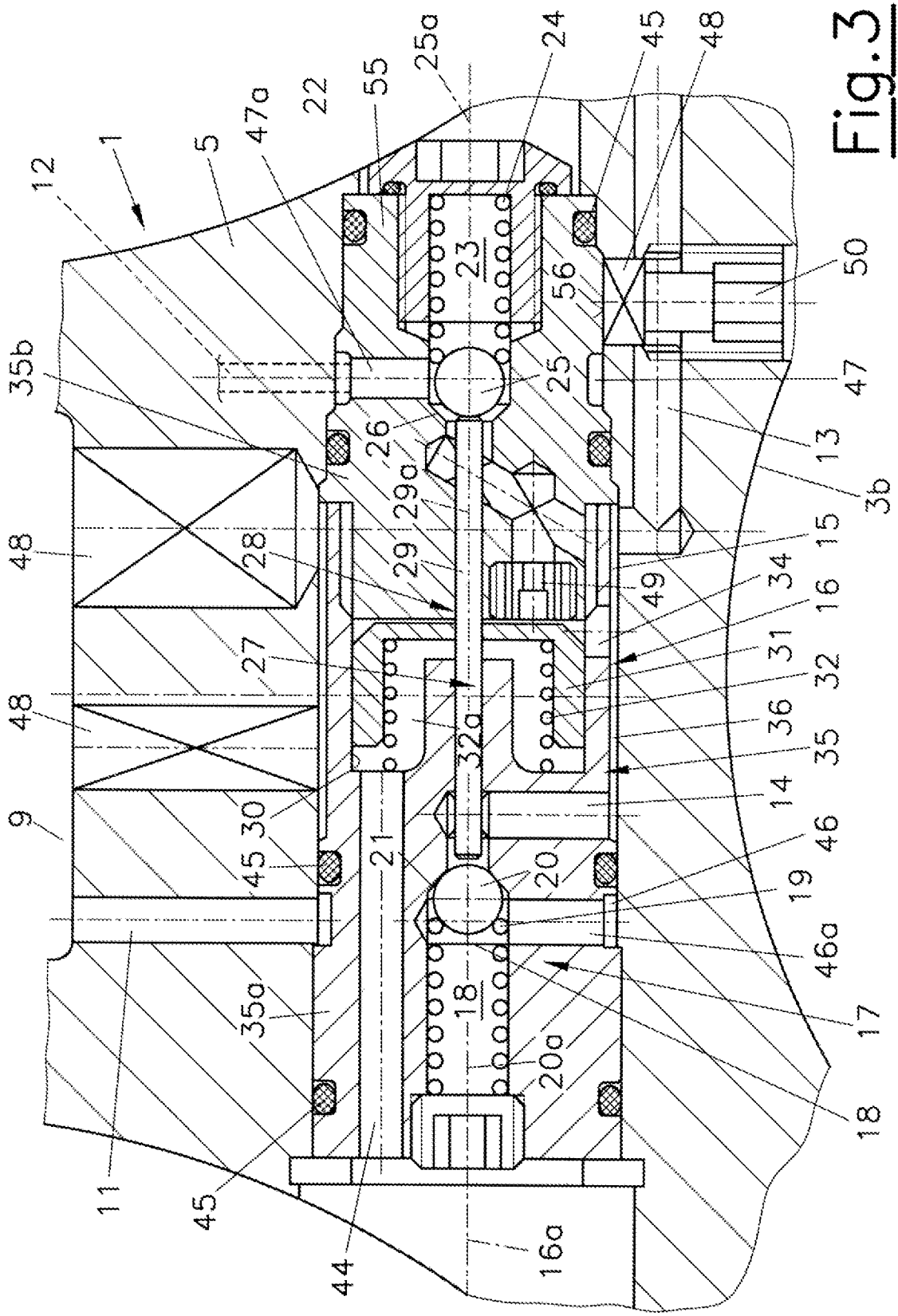

bodies are operatively interconnected via a connecting device that can be displaced between a first position and a second position.

28 Claims, 21 Drawing Sheets

(51) Int. Cl.
    *F16K 11/048*     (2006.01)
    *F16K 11/056*     (2006.01)
    *F02D 15/02*     (2006.01)
    *F16C 7/06*     (2006.01)
    *F16C 7/04*     (2006.01)

(52) U.S. Cl.
    CPC ............... *F16K 11/18* (2013.01); *F16C 7/04* (2013.01); *F16C 7/06* (2013.01); *F16C 2360/22* (2013.01)

(56) References Cited

U.S. PATENT DOCUMENTS

| | | | | |
|---|---|---|---|---|
| 4,140,091 A * | 2/1979 | Showers, Jr. | ......... | F02B 75/045 123/78 BA |
| 4,195,601 A * | 4/1980 | Crise | ............... | F02B 75/045 123/48 B |
| 4,406,256 A * | 9/1983 | Akkerman | ............ | F02B 75/048 123/197.1 |
| 5,562,068 A * | 10/1996 | Sugimoto | ............ | F02B 75/045 123/197.4 |
| 9,845,738 B2 * | 12/2017 | Pluta | ............... | F02B 75/045 |
| 2010/0132672 A1 * | 6/2010 | Lee | ............... | F02B 75/047 123/48 B |
| 2010/0218746 A1 * | 9/2010 | Rabhi | ............... | F16K 11/161 123/48 B |
| 2015/0152794 A1 | 6/2015 | Paul | | |

FOREIGN PATENT DOCUMENTS

| | | |
|---|---|---|
| CN | 102330561 | 1/2012 |
| CN | 103047409 | 4/2013 |
| DE | 2414020 | 10/1975 |
| DE | 3149306 | 6/1983 |
| DE | 102008038971 | 2/2010 |
| DE | 102012020999 | 1/2014 |
| DE | 102013210494 | 12/2014 |
| DE | 102013113432 | 6/2015 |
| DE | 102015001066 | 10/2015 |
| GB | 161580 | 7/1922 |
| JP | S61-24804 | 2/1986 |
| JP | 2010-112448 | 5/2010 |
| NL | 7602119 | 9/1977 |
| RU | 2226626 | 4/2004 |
| SU | 1008523 | 3/1983 |
| WO | WO 02/10568 | 2/2002 |
| WO | WO 2014/005984 | 1/2014 |
| WO | WO 2015/055582 | 4/2015 |

OTHER PUBLICATIONS

Official Action for Austria Patent Application No. 50389/2016, dated Apr. 11, 2017, 6 pages.
Official Action for Austria Patent Application No. 50389/2016, dated Jul. 10, 2017, 7 pages.
Decision to Grant for Austria Patent Application No. 50389/2016, dated Oct. 4, 2017, 3 pages.
Search Report for Australia Patent Application No. 15006, dated Apr. 3, 2017, 2 pages.
Search Report for Austria Patent Application No. 50511/2015, dated May 11, 2016, 3 pages.
English Translation of International Preliminary Report on Patentability for International (PCT) Patent Application No. PCT/EP2016/064193, dated Dec. 28, 2017, 7 pages.
International Search Report prepared by the European Patent Office dated Oct. 20, 2016, for International Application No. PCT/EP2016/064193.
Official Action with machine translation for Russia Patent Application No. 2018101616/06, dated Feb. 20, 2019, 9 pages.
Official Action with English Translation for China Patent Application No. 201680048177.6, dated Jul. 30, 2019, 18 pages.
Official Action with machine translation for Japan Patent Application No. 2017/565260, dated Jul. 22, 2019, 19 pages.

* cited by examiner

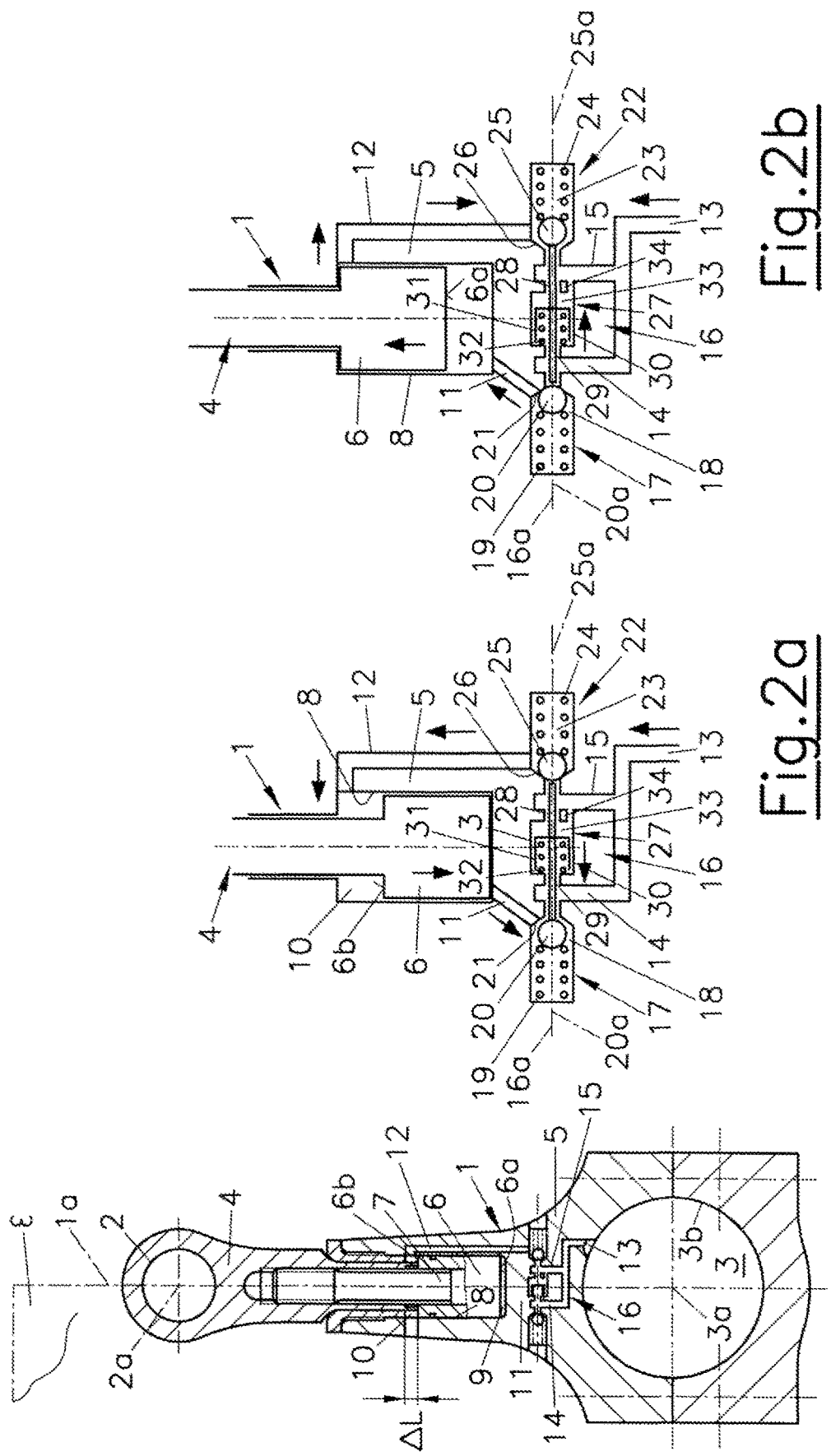

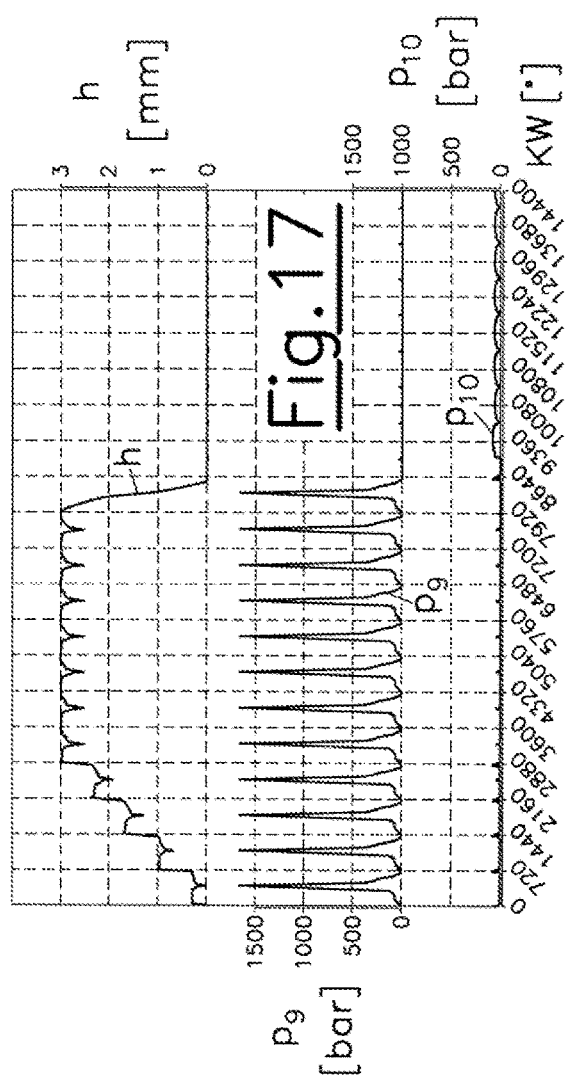
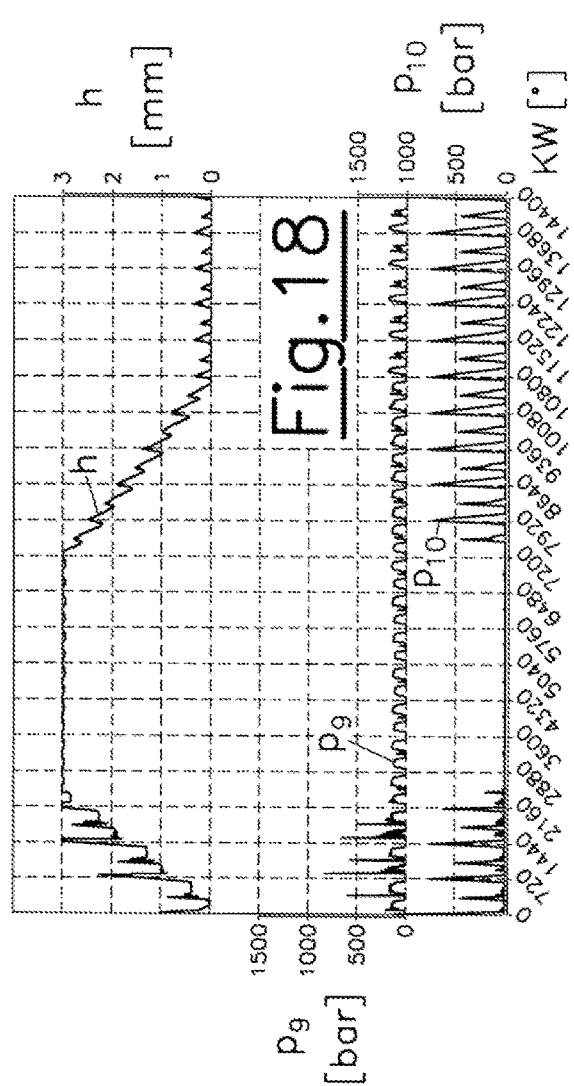
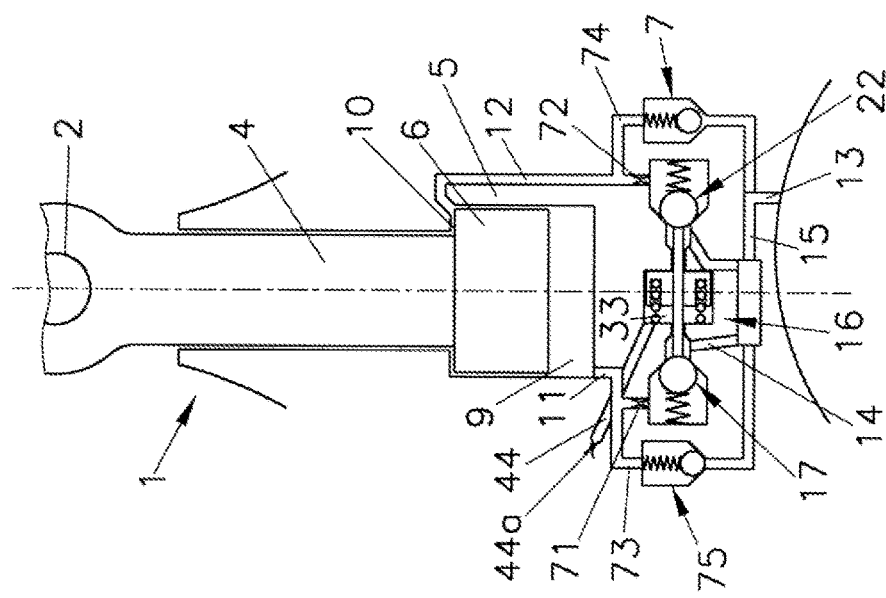

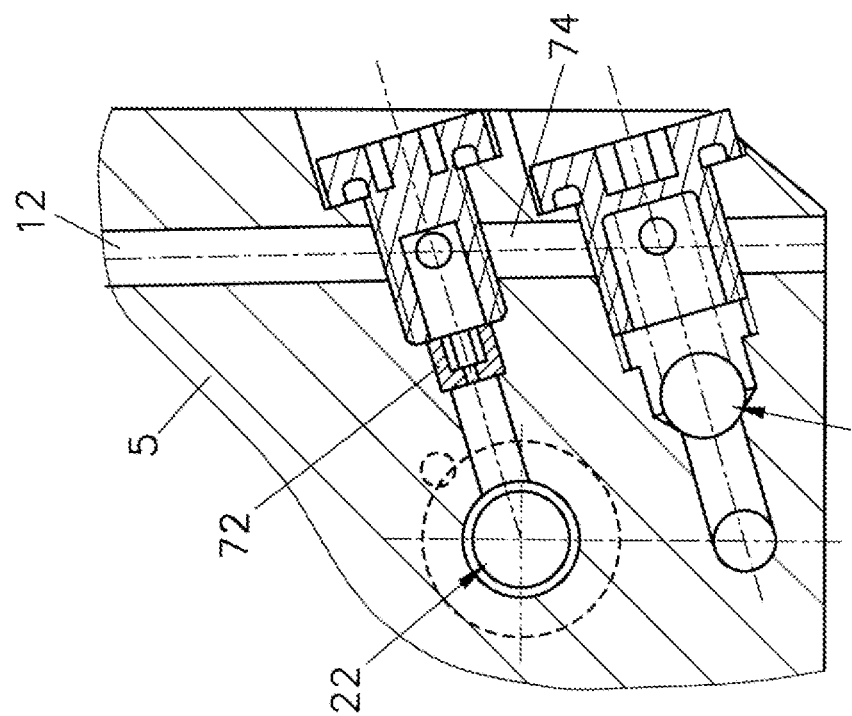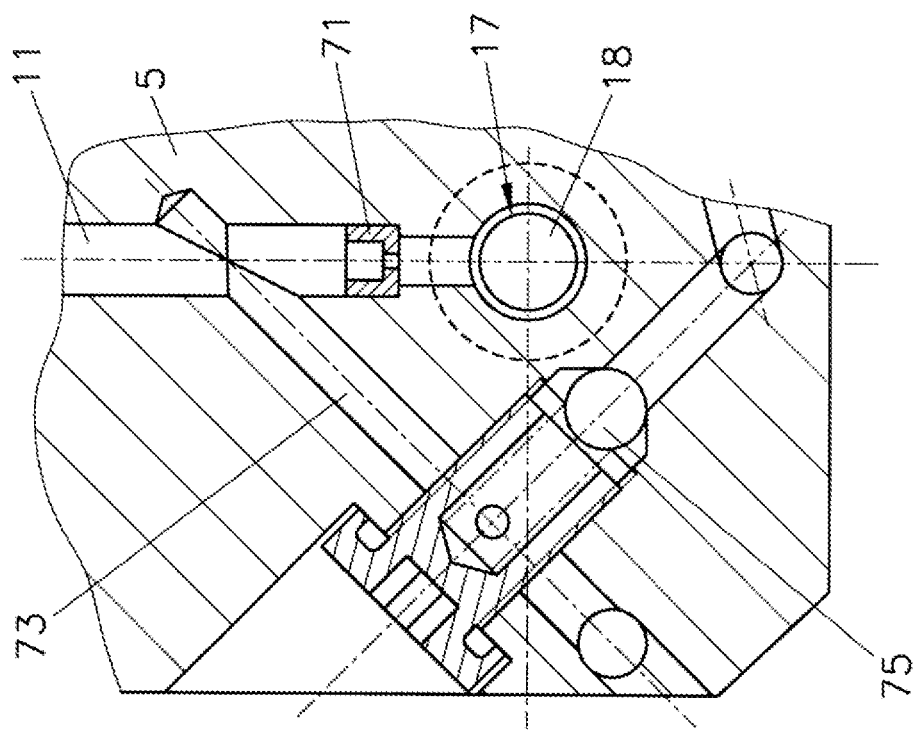

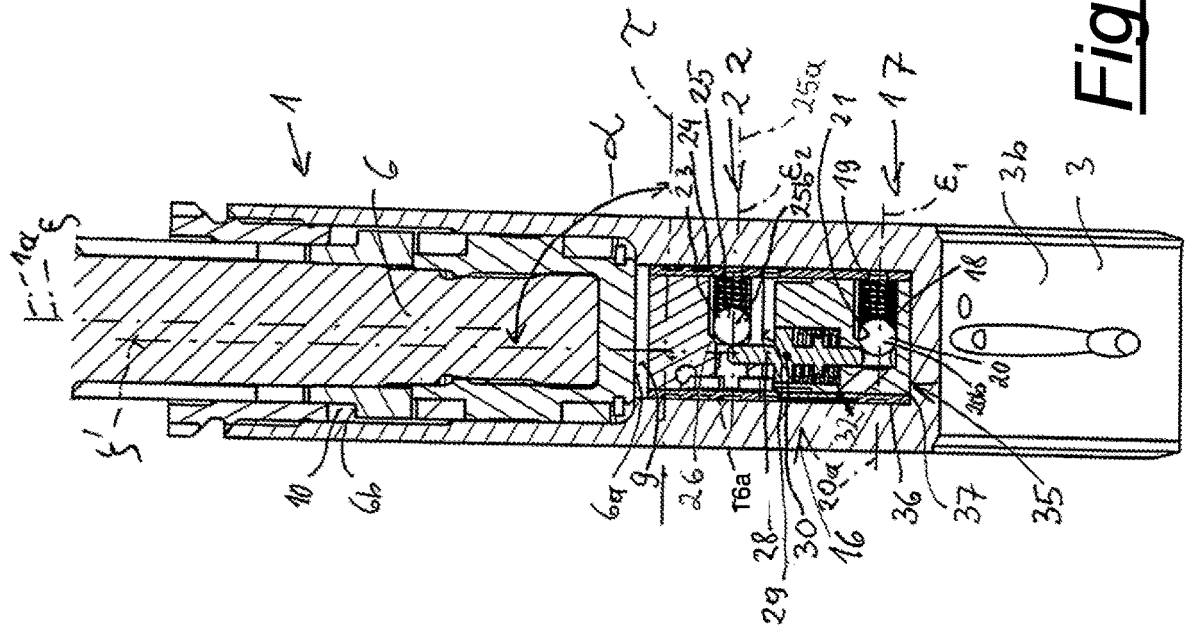

LONGITUDINALLY ADJUSTABLE CONNECTING ROD

CROSS REFERENCE TO RELATED APPLICATIONS

This application is a national stage application under 35 U.S.C. 371 and claims the benefit of PCT Application No. PCT/EP2016/064193 having an international filing date of 20 Jun. 2016, which designated the United States, which PCT application claimed the benefit of Austria Patent Application No. A 50511/2015 filed 18 Jun. 2015 and Austria Patent Application No. A 50389/2016 filed 29 Apr. 2016, the disclosure of each of which are incorporated herein by reference in their entireties.

The invention relates to a length-adjustable connecting rod for a reciprocating piston engine, with at least one first rod part and one second rod part, with the two rod parts being displaceable telescopically toward and/or in one another in the direction of a longitudinal axis of the connecting rod by means of a length-adjusting means, with the length-adjusting means being chargeable via at least one hydraulic channel with a hydraulic medium, and with the at least one hydraulic channel being fluidly connectable by a control device to at least one hydraulic medium supply channel.

In order to optimize internal combustion engines in terms of emissions and consumption, variants with alterable compression ratios are being increasingly studied. By changing the compression of a combustion engine, it is possible to run with a lower compression ratio at full load and with an elevated ratio at partial load and when starting. In this way, consumption is improved in the partial load range, the compression level is increased with the elevated compression ratio when starting, and the peak compression is reduced with a lower ratio at high power, and knocking is prevented.

AT 511 803 B1 describes a longitudinally displaceable connecting rod for a combustion engine with two rod parts that can be displaced into one another telescopically, with a high-pressure chamber being disposed between the first and second rod parts into which an oil passage leads whose throughput is controlled by means of a control device that is embodied as a valve spool. The control device has a direction of motion that is normally aligned with a crankshaft axis of the combustion engine.

Moreover, a telescopically adjustable connecting rod is known from AT 514 071 B1 in which one rod part of the connecting rod forms a guide cylinder and another rod part of the connecting rod forms a piston member that can be displaced longitudinally in the guide cylinder, with a first high-pressure chamber being disposed between the piston member and the guide cylinder on one side of the piston and a second high-pressure chamber being disposed on the other side of the piston, into which chambers oil passages lead whose throughputs are controlled by means of a control device with a valve spool. The control device has moving parts here which, as in AT 511 803 B1, are oriented normally to the crankshaft axis and sometimes also parallel to the connecting rod longitudinal axis.

In this context, a "valve spool" is understood to be a control valve with a valve chamber and at least one valve inlet that is fluidly connected to the valve chamber and at least one valve outlet that is fluidly connected to the valve chamber, with the valve chamber being preferably cylindrical and with at least one valve inlet and/or at least one valve outlet leading particularly radially into the valve chamber, and with an axially displaceable control plunger being arranged within the valve chamber with which the valve inlets or outlets can be released or blocked through axial displacement within the valve chamber.

Valve spools are usually sealed by means of seal rings (O-rings)—particularly the control plungers in relation to the surrounding cylinder and/or the surrounding valve chamber—but when the valve spool is deflected axially, the radial openings of the guide cylinder or of the valve chamber of the oil passages or the valve inlets and outlets to be controlled are traveled over by the seal rings, which can result in increased wear and a shorter service life.

With combustion engines with the above-described connecting rods, good results can be achieved at low speeds such as those that can be expected in commercial vehicles, for example. In the range of higher speeds starting at about 3000 RPM, however, additional effects can occur which can hamper proper functioning and particularly proper control of the connecting rod, more particularly proper control of the length adjustment of the connecting rod. For example, high inertial forces act on valve bodies that are installed in the connecting rod, particularly at higher speeds, which can result in leakage from valves that are in fact closed.

One additional difficulty arises, particularly at higher speeds, as a result of the masses moved in the connecting rod—which does not only involve the components of the control device, but also the above-described oil passages that are filled with motor oil or another hydraulic medium. At high speeds, the contained oil column exerts forces on the system that cannot be managed with known solutions.

No solutions can be found in the prior art that enable length-adjustable connecting rods to be properly controlled at high speeds such as those which occur in the passenger car and high performance range.

It is therefore an object of the invention to avoid at least one of the abovementioned drawbacks of the prior art, particularly to increase the service life in a length-adjustable connecting rod and preferably also to enable the reliable, reproducible adjustment of the connecting rod length.

A connecting rod according to the invention is characterized in that the control device has a first valve and a second valve, each with a valve body that is arranged in a valve chamber, wherein it is possible for the valve body to be pressed by a restorative force against a valve seat, wherein a first valve chamber of the first valve is fluidly connected to a first hydraulic channel and a second valve chamber of the second valve is fluidly connected to a second hydraulic channel, and the valve bodies are operatively interconnected via a connecting device that can be displaced at least between a first position and a second position, and wherein, in the first position of the connecting device, the first valve body and, in the second position of the connecting device, the second valve body can be lifted counter to the restorative force from the associated first and second valve seat, respectively, and the corresponding first and second valve chamber can be fluidly connected to the hydraulic medium supply channel and, in the respective other position of the connecting device, the first valve body rests on the first valve seat and the second valve body rests on the second valve seat to block the fluid connection to the hydraulic medium supply channel.

Thus, instead of a valve spool, the control device of a connecting rod according to the invention has simple poppet valves, each of whose (for example) spherical valve bodies that are biased by a restorative force, preferably spring-loaded, can be pressed against a valve seat in order to block the associated valve outlet or can be lifted from the valve seat, in which case the throughput of the corresponding oil passage is opened as a result of the lifting of the valve body from the valve seat. Through the use of simple poppet valves instead of a valve spool, particularly in order to control the length adjustment, the service life of the associated control device and thus the service life of the connecting rod can be improved appreciably.

The restorative force acting on the valve body of the first and/or second valve is preferably created by a valve spring in each case.

The connecting device has the task of alternatively opening the first valve or the second valve.

In terms of the invention, a "connecting rod" is understood to be the rod-like connecting element that is usually arranged between piston and crankshaft in reciprocating piston engines and by means of which the piston is mechanically connected to the crankshaft.

In terms of the invention, a "reciprocating piston engine" is a machine with which a linear lifting movement of a piston can be converted into a rotational movement of a shaft or, conversely, a rotational movement of a shaft can be converted into a linear lifting movement of a piston.

A "reciprocating piston combustion engine" in terms of the invention, which is also referred to in simplified form as a combustion engine, is a reciprocating piston engine in which the linear movement of the piston is produced by a change in the volume of a gas, with the change in the volume of the gas being brought about by a combustion process.

The first rod part of a connecting rod according to the invention is preferably the rod part that faces toward the piston in a functional installed state of a connecting rod according to the invention in a reciprocating piston engine and, in particular, is provided for the purpose of connecting to the piston of a reciprocating piston engine. For this purpose, as is customary in connecting rods, the first rod part preferably has a small connecting rod end that is embodied as a connecting-rod bearing and is particularly embodied such that it can be connected to the piston by means of a piston pin.

The second rod part of a connecting rod according to the invention is preferably the rod part that faces toward the crankshaft in a functional installed state of a connecting rod according to the invention in a reciprocating piston engine and, in particular, is provided for the purpose of connecting to the crankshaft. For this purpose, the second rod part preferably has a big connecting rod end, with the big end of the connecting rod, as is generally customary in connecting rods, being likewise preferably embodied as a connecting-rod bearing and being particularly designed for the purpose of fastening the connecting rod to the crankshaft of a reciprocating piston engine.

In terms of the invention, a "hydraulic channel" is understood particularly as a tubular connection (line) that is designed to have a hydraulic medium flow through it, with the term "hydraulic channel" being used hereinafter synonymously with the term "oil passage."

In terms of the invention, a "hydraulic medium supply channel" is understood as a hydraulic channel or an oil passage that is designed for the purpose of supplying at least one component and/or at least one volume that can be filled with a hydraulic medium—that is, to feed and/or conduct hydraulic medium to a component and/or to a volume. In the following, the term "hydraulic medium supply channel" is used synonymously with the term "oil supply passage."

The restorative force against which the valve body of the first valve and of the second valve can be respectively lifted from the associated first and second valve seat is preferably applied by an appropriately designed valve spring that exerts a suitably selected spring force.

In principle, the length-adjusting means of the connecting rod can be embodied in any desired manner. In one variant of the invention, the length-adjusting means is embodied such that one of the two rod parts is embodied as a guide body and the other rod part as a plunger element that can be displaced in the guide body, with a first high-pressure chamber being disposed particularly between a first front side of the plunger element and the guide body and a second high-pressure chamber being disposed between a second front side of the plunger element and the guide body, with the first hydraulic channel leading into the first high-pressure chamber and the second hydraulic channel leading into the second high-pressure chamber. With a connecting rod that is designed in such a way, it is especially simple to implement a length-adjustable connecting rod, particularly a hydraulically length-adjustable connecting rod.

In order to adjust the length of such a connecting rod according to the invention, a preferably pressurized hydraulic medium can be fed to the control device, particularly via the hydraulic medium supply channel. One of the two respective hydraulic channels, each of which is connected to one of the two high-pressure chambers, can be fluidly connected to the hydraulic medium supply channel by means of the control device.

Depending on the state of the control device, particularly depending on the position of the connecting device of the control device, either the first hydraulic channel and hence the first high-pressure chamber or the second hydraulic channel and hence the second high-pressure chamber is fluidly connected to the hydraulic medium supply channel.

Depending on which of the two high-pressure chambers has the greater pressure, the two rod parts of the connecting rod are pushed telescopically apart or together, so that the connecting rod length increases or decreases.

In the following, the term "hydraulic medium" is used synonymously with the term "actuating medium."

In an advantageous embodiment of a connecting rod according to the invention, the connecting device has at least one connecting element that can be displaced between a first position and a second position, with the first valve body and the second valve body being operatively interconnected by means of the connecting element.

Preferably, a provision is made that the connecting element is securely connected to a control plunger that can be displaced in a control cylinder and that borders a control chamber into which a control line leads that is preferably fluidly connected to the oil supply passage. By pressurizing the control chamber, the control plunger can be deflected counter to a restorative force that is created by a return spring.

In a functional state of use of a connecting rod according to the invention in a combustion engine, the control plunger and hence the connecting element as well can be deflected by means of the oil pressure present in the hydraulic medium supply channel. It will readily be understood that this is only possible insofar as the oil pressure is sufficient to overcome the restorative force of the return spring. Preferably, the control device is embodied such that the responsiveness of the control plunger can be appropriately adjusted via the spring force of the return spring, at least within certain limits.

In an especially simple structural embodiment of a combustion engine with a connecting rod according to the invention, the lubricating oil or motor oil provided for the purpose of lubricating the connecting-rod bearing in the big end of the connecting rod and fed to this region can be used in order to control the length adjustment of the connecting rod, particularly in order to deflect the control plunger and thus actuate the control device, in which case the lubricating oil can be preferably fed to the control device via the hydraulic medium supply channel for this purpose.

In other words, a connecting rod according to the invention that is embodied in the manner described above makes it possible in particular to exploit the oil pressure present in the combustion engine to control the length adjustment of the connecting rod, so that no additional oil pressure generating means is required. In general, the oil pressures that occur during the operation of a combustion engine are also suitable for this purpose.

In another advantageous embodiment of a connecting rod according to the invention, the valve bodies and the connecting device, particularly the valve bodies and the connecting element, are inherently separate components, in which case the connecting device, particularly the connecting element, is spaced apart from the second valve body in the first position and from the first valve body in the second position. This ensures that, for a long stroke, there is always only one valve open and the respective other valve is closed. For a shorter stroke, both valves can also be open in principle.

In another advantageous embodiment of a connecting rod according to the invention, the connecting element is embodied as an axially displaceable tie rod.

Preferably, the connecting element is arranged parallel to the median longitudinal plane of the connecting rod or in the median longitudinal plane of the connecting rod and can be displaced axially particularly parallel to the median longitudinal plane of the connecting rod or on the median longitudinal plane of the connecting rod, with the median longitudinal plane of the connecting rod preferably corresponding to an oscillation plane of the connecting rod.

Meanwhile, in an alternative embodiment, the connecting element, particularly the tie rod, is arranged normal to the median longitudinal plane of the connecting rod and can be particularly displaced axially normal to the median longitudinal plane or on a plane that is normal to the median longitudinal plane of the connecting rod.

In another advantageous embodiment of a connecting rod according to the invention, the connecting element is embodied as an axially displaceable tie rod that is arranged normal to the longitudinal axis of the connecting rod.

Here, the tie rod can be embodied particularly as a tie rod that is arranged normal to the longitudinal axis of the connecting rod and can be displaced in a guide of the connecting rod. The connecting element has the task of alternatively opening the first valve or the second valve.

Depending on the position of the connecting device or of the control plunger, the first valve or the second valve of the control device is respectively opened, so that the hydraulic medium supply channel is fluidly connected either to the first high-pressure chamber or the second high-pressure chamber in the connecting rod. As a result, pressurized hydraulic medium can be discharged from the respective associated high-pressure chamber via the hydraulic medium supply channel. A suction effect that is so strong that the other valve, which is actually closed, is opened as a result of the suction effect (the valve body lifts from the valve seat as a result of the suction effect) occurs particularly at the same time as a result of the inertial forces in action in a combustion engine during the lifting movements of the connecting rod due to the accelerations of the connecting rod as well as due to the forces acting on the connecting rod as a result of the combustion process, so that the respective other high-pressure chamber fills with hydraulic medium. With increased filling of the high-pressure chamber, hydraulic medium is increasingly discharged from the other high-pressure chamber. The connecting rod length changes as a result. Depending on the design of the connecting rod, particularly of the control device, and depending on the operating state of the combustion engine, a plurality of strokes of the combustion engine may be necessary before a maximum possible change in the length of the connecting rod has been achieved.

In an especially advantageous embodiment of a connecting rod according to the invention, the connecting element is preferably the connecting rod, which can be displaced along a displacement axis, with the displacement axis preferably not running normal to the longitudinal axis of the connecting rod, but rather particularly spanning an angle $\alpha$ with the normal plane with respect to a longitudinal axis of the connecting rod for which the following relationship holds: $0° < \alpha <= 90°$. In words, the relationship is as follows: $0°$ is less than angle $\alpha$ is less than or equal to $90°$.

The displacement axis of the connecting element is therefore especially preferably inclined with respect to a normal plane to the longitudinal axis of the connecting rod. The displacement axis can thus be arranged between a position that is practically normal to a longitudinal axis of the connecting rod (angle $\alpha$ near $0°$) and a position that runs parallel to a longitudinal axis of the connecting rod (angle $\alpha=90°$). By virtue of the inclined arrangement, it is possible to compensate for the disruptive influences of the inertia of the hydraulic medium column in the hydraulic channels and the components of the control device, particularly of the connecting element, through the appropriate selection of the angle. In one variant of the invention, the hydraulic medium supply channel extends between a connecting-rod bearing of the big end of the connecting rod (with the hydraulic medium supply channel expediently leading via the extraction hole to the connecting-rod bearing and/or to a groove formed in the connecting-rod bearing) and the control device. Disturbances and/or malfunctions in the control of the control device can thus be prevented. Motor oil can be used as a hydraulic medium, for example. Moreover, additional disruptive influences on components of the length adjustment that arise at high speeds can be minimized by this arrangement. Examples of this are valve elements and other adjustment mechanisms whose effect is impaired by inertial forces occurring at high speeds.

In a simple embodiment of the invention, the connecting element can be arranged parallel to or coaxial with the longitudinal axis of the connecting rod, which corresponds to an angle $\alpha$ of $90°$. However, especially good results can be achieved if the angle $\alpha$ is between $30°$ and $60°$, preferably between $40°$ and $50°$.

In one variant of the invention, the displacement axis is arranged so as to be parallel or coincide with an oil resultant. "Oil resultant" is understood here to refer to the column of hydraulic medium between the extraction point in the big end of the connecting rod and its point of action on the control device; in one variant of the invention, the oil resultant is conducted toward the control device through a connecting line between the extraction point in the big end of the connecting rod (the hole center in the case of an extraction hole) and the operative position of the hydraulic medium column. The term "oil resultant" does not exclude the use of hydraulic media other than oil. In the following, the term "oil column" is used synonymously for the term "hydraulic medium column." Due to the fact that the displacement axis is parallel to or coincides with the oil resultant, the inertial force of the hydraulic medium column between the extraction in the connecting-rod bearing and the point of action and the inertial forces of the control device can compensate each other. In addition, the material and weight of the control device can be optimized to the effect that the above-described compensation is especially effective. With these embodiments, both the inertial influences of the hydraulic medium and other forces that act upon the components of the control device at high speeds from about 3000 RPM can be optimally reduced.

The arrangement of the displacement axis of the connecting element in relation to the oil resultant thus enables the phases of the oscillatory movements of the oil column and of the connecting element to be balanced out. By adjusting the mass of the connecting element, the amplitudes of the oscillations can be balanced out such that the inertial force of the connecting element is equivalent to the inertial force of the oil column (particularly the force that is acting on the connecting element). The force component parallel to the longitudinal axis of the connecting rod of a return spring of the connecting element acts in the direction of the small end of the connecting rod. In other words, according to the invention, the displacement axis of the connecting element is arranged parallel to an oil resultant, and the mass of the connecting element is adapted to the mass of the oil resultant. The adaptation of the mass to the inherent or accelerated mass (particularly at high speeds) of the oil resultant—i.e., of the hydraulic medium located in the lines—can thus be coordinated.

As described above, the hydraulic medium supply channel usually extends from the connecting-rod bearing that is associated with the big end of the connecting rod. Very high acceleration forces can occur particularly in this region during the operation of the combustion engine. In one variant of the invention, the hydraulic medium supply channel therefore extends from an area of the connecting-rod bearing that is located in a range between a 40° and 320° peripheral angle of the big end of the connecting rod, with 0° being defined as the intersection point between the longitudinal axis of the connecting rod and the big end of the connecting rod that is closest to the small end of the connecting rod. Especially favorable results have been achieved if the hydraulic medium supply channel extends from the big end of the connecting rod at a peripheral angle in the range of about 315°. This arrangement is particularly advantageous if the angle α is selected so as to be in the range from 30°-60°. If the angle α is selected so as to be in the range of 90°, then it is favorable if the hydraulic medium supply channel extends in the range between 135° and 225°, particularly 180°.

In other words, in an advantageous embodiment of a connecting rod according to the invention, the hydraulic medium supply channel extends from an area of the connecting-rod bearing that is located in a range between a 40° and 320°, preferably about a 315° peripheral angle of the connecting-rod big end, with 0° being defined as the intersection point between the longitudinal axis of the connecting rod and the big end of the connecting rod that is closest to the small end of the connecting rod.

Disruptive influences caused by the inertia of the oil column can thus be minimized and shorter holes can be used. Moreover, since the region of the connecting-rod bearing between 320° and 40° is subjected to an especially high level of compressive stress due to the combustive force during the operation of the connecting rod and holes, recesses, and grooves in this region can result in a weakening—and, in extreme cases, to bearing damage—in the big end of the connecting rod, this risk can be reduced through the provision of boreholes outside of this region.

In a simple and space-saving design variant of the invention, a provision is made that a first lift axis of the first valve body is coaxial with the longitudinal axis of the displacement rod, i.e., the tie rod, with the first valve being arranged in the vicinity of a first end of the tie rod.

Moreover, in one easy-to-manufacture and space-saving embodiment, a provision can be made that a second lift axis of the second valve body is coaxial with the longitudinal axis of the tie rod, in which case the second valve is arranged in the vicinity of a second end of the tie rod and the valve seats of the first and second valves face away from one another. The lift axes of the valve bodies and the longitudinal axis of the tie rod are thus arranged so as to be normal to the longitudinal axis of the connecting rod.

However, for combustion engines at high speeds, such as over 4000 RPM, for example, it can be advantageous if the first lift axis of the first valve body is not coaxial with the longitudinal axis of the tie rod, but rather is arranged so as to be inclined by a first angle of about 90°+/−60° with respect to the longitudinal axis of the tie rod. In this way, the first valve body can be prevented from lifting off the first valve seat at high speeds as a result of the inertial forces.

Here, at least one preferably rod-shaped first transmission element can be arranged so as to be axially displaceable between the first valve body and the tie rod, with the first displacement axis of the transmission element being preferably arranged so as to be coaxial with the first lift axis of the first valve body. This enables an axial displacement of the connecting element to be converted in an especially simple manner into a lifting movement of the associated first valve body along the first lift axis—that is, into a lifting of the first valve body along the first lift axis.

Combustion engines with even higher speeds—up to 8800 RPM, for example—can be operated if the second lift axis of the second valve body is also arranged so as to be inclined at a second angle of about 90°+/−60° with respect to the longitudinal axis of the tie rod. As with the first valve body, this also prevents the second valve body from lifting from the second valve seat at very high speeds due to the inertial forces.

That is, particularly in the case of a connecting rod that is to be used in a combustion engine with speeds above 3000 RPM, a provision is preferably made that at least one lift axis—that is, the first lift axis of the first valve body and/or the second lift axis of the second valve body—is arranged so as to be inclined at an angle of about 90°+/−60° with respect to the longitudinal axis of the tie rod.

For higher speeds—particularly at speeds from about 4000 RPM to about 8800 RPM—it is especially advantageous if the first lift axis and the second lift axis (that is, both lift axes) are arranged so that each is inclined at an angle of about 90°+/−60° with respect to the longitudinal axis of the tie rod.

Analogously, at least one preferably rod-shaped second transmission element can be arranged here so as to be axially displaceable between the second valve body and the tie rod, with the second displacement axis of the second transmission element being preferably arranged so as to be coaxial with the second lift axis of the second valve body. Accordingly, this enables an axial displacement of the connecting element to be converted in an especially simple manner into a lifting movement of the associated second valve body along the second lift axis—that is, into a lifting of the second valve body along the second lift axis.

In order to enable a deflection of the actuating force of the tie rod toward the first valve and/or second valve in a simple manner—that is, a conversion of the axial translational movement in a lifting motion of the associated valve body—it is advantageous if at least one preferably spherical deflection element is arranged between the first transmission element and the tie rod and/or between the second transmission element and the tie rod, with the deflection element being especially preferably arranged in a deviated borehole connecting the receiving holes of the tie rod and of the first and/or second transmission element at an angle of inclination of greater than 0° in relation thereto. The tie rod thus acts indirectly via at least one deflection element and at least one transmission element on the valve body of the corresponding first or second valve. The use of deflection elements offers the advantage that the tie rod can be constructed with a very small thickness, since the thickness does not have any impact on the stroke length of the valve bodies.

Alternatively to a deflection element that is arranged between tie rod and transmission element, a provision can be made that the tie rod acts directly on the first or second transmission element, at least in one position.

Here, at least one end of the connecting element, particularly at least one end of the tie rod, and/or of the first and/or second transmission element has a conical or spherical shape. In this case, the thickness of the connecting rod has an impact on the maximum possible stroke length of the valve body to be controlled. The thickness of the connecting rod should be at least twice the stroke length of the valve body. In this case, a separate deflection element can be omitted.

In this way, the valve bodies formed by balls, for example, can be deflected easily and with little resistance.

In the case of a control device with at least one valve with a stroke path that does not run coaxially with the tie rod, the thickness of the tie rod is understood as being the diameter of the tie rod in a direction parallel to this stroke path. This applies both to tie rods having a round cross section and to tie rods having an n-gonal cross section.

In the case of a control device with valves whose lift axes both run coaxially with the tie rod, the thickness of the tie rod is preferably the maximum diameter of the tie rod.

In a simple and space-saving design variant of the invention, a provision is made that the first lift axis of the first valve body is normal to the displacement axis of the connecting element and/or to the longitudinal axis of the connecting rod, with the first valve being arranged in the vicinity of a first end of the connecting element.

Moreover, in an easy-to-manufacture and space-saving embodiment of the invention, a provision is made that the second lift axis of the second valve body is normal to the displacement axis of the connecting element and/or to the longitudinal axis of the connecting rod, with the second valve being arranged in the vicinity of a second end of the connecting element. The lift axes of the valve bodies are thus arranged on planes that are normal to the displacement axis of the connecting element and/or on planes that are normal to the longitudinal axis of the connecting rod. The first and the second lift axes of the first and second valve bodies, respectively, thus lie on mutually spaced-apart planes, with the spacing between the two planes being expediently greater than the length of the connecting element.

In one variant of the invention, the first lift axis of the first valve body and/or the second lift axis of the second valve body run parallel to a crankshaft axis. In another variant, the displacement axis of the connecting element can also run parallel to the crankshaft axis, that is, normal to the median longitudinal plane and/or the oscillation plane of the connecting rod. This prevents inertial forces of the valve body from acting in the spring direction of the valve body pretension and unintendedly opening the valve as a result. In addition, the valve bodies can be embodied and/or guided such that unintended opening of the valves is prevented by inertial influence.

A stable position of the connecting element under low controlling pressure can be achieved if the connecting element can be deflected counter to the force of a return spring, in which case a force component of the restorative force that is oriented parallel to the longitudinal axis of the connecting rod preferably acts in the direction of the small end of the connecting rod. In this way, reliable control of the length adjustment can be ensured even when the combustion engine is operating at very high speeds.

In another embodiment of the invention, a provision can be made that the control cylinder has on its outer periphery an annular space that is preferably formed by a circumferential annular groove and is fluidly connected to the control chamber or a high-pressure chamber. In this way, an unintentional displacement of the control plunger and thus of the displacement means in certain operating ranges as a result of pressure impacts upon opening of one of the two valves, for example, can be prevented, because the control plunger is clamped or blocked by the filling of the annular space.

In a connecting rod whose control device has at least one part that is mounted so as to be displaceable in the direction of a displacement axis, with the displacement axis being preferably arranged on an oscillation plane of the connecting rod—and particularly normal to the longitudinal axis of the connecting rod—a provision can be made that at least one back-and-forth-moving part of the control device has at least one buoyancy body or is embodied at least in part as a buoyancy body.

The part of the control device that moves back and forth or can be displaced in one direction is preferably the control plunger and/or the connecting device, particularly the connecting element.

In an especially preferred embodiment of the invention, a provision is made that the connecting device has at least one buoyancy body or is embodied at least in part as a buoyancy body. The tie rod can be hollow, for example, and thus constitute a buoyancy body itself. Alternatively or in addition to this, a provision can be made that at least one valve body has at least one buoyancy body or is embodied at least in part as a buoyancy body.

The buoyancy body floating in the actuating medium preferably has a lower density than the oil to be actuated (such as motor oil, for example), i.e., than an actuating medium with which the control device can be actuated, in which case, in a functional state of use of the connecting rod in a reciprocating piston engine, the control device can be preferably actuated with the lubricating oil or motor oil conducted in the reciprocating piston engine. The buoyancy body can be embodied as a hollow body or as a closed-cell foam body made of polystyrene, for example. Preferably, the buoyancy body is securely connected to the back-and-forth-moving part or integrally formed therewith.

By virtue of the buoyancy body that is securely connected to or integrally formed with the back-and-forth-moving part, the accelerated mass can be reduced in application of the Archimedean principle according to which the static buoyancy of a body in a medium is just as great as the weight of the medium displaced by the body.

All of the abovementioned measures contribute to enabling the density of the overall system and the masses on which lateral accelerations act as a result of the rotation of the crankshaft to be substantially reduced. In this way, engine speeds far in excess of 7000 RPM can be achieved without restriction of the function of the length-adjustability of the connecting rod.

Preferably, at least one back-and-forth-moving part of the control device is formed by a control plunger that is displaceably supported in a cylinder whose first front side borders a control chamber that can be charged with oil or with the actuating medium and whose second front side borders a spring chamber having a return spring. In a preferred embodiment of the invention, a provision is made that at least one buoyancy body is arranged in the vicinity of the first front side and/or in the vicinity of the second front side of the control plunger, in which case the control plunger preferably has defined leakage between the control chamber and the spring chamber.

A substantial reduction in the accelerated mass can be achieved particularly if a buoyancy body is arranged both in the vicinity of the first front side and in the vicinity of the second front side bordering the spring chamber. For this purpose, it is necessary for the spring chamber to be flooded with oil, with it not being necessary in principle to flood the spring chamber, but rather only in connection with the buoyancy function when the inertial forces are to be reduced by means of a buoyancy body. This flooding of the spring chamber can be achieved with especially little effort if the control plunger has a defined leakage between the control chamber and the spring chamber, with the spring chamber being preferably fluidly connected to a storage chamber, which can be arranged in the same rod part of the connecting rod as the control device, for example.

In terms of the invention, "leakage" is understood as the flow of oil or hydraulic medium via or through narrow openings and gaps as a consequence of the existing pressures.

"Defined leakage" is understood to be leakage that has been constructively and deliberately provided or formed, with the dimensions of the cooperating components, particularly the tolerance backlash and the fitting of the components with one another, being preferably selected for this purpose such that a defined leakage occurs—that is, a defined flow of oil or hydraulic medium through narrow openings and gaps as a consequence of the existing pressure.

If the storage chamber is connected by a throttle to the crankcase, an unimpeded reflux of the oil into the crankcase chamber can be achieved.

The spring chamber of the control plunger is thus always filled with oil, since sufficient oil can always be sucked out of the storage chamber and/or through leakages by virtue of the back-and-forth movements of the control plunger. The throttle enables a damping of the movement of the control plunger, whereby the latter is rendered less sensitive to possible returning pressure waves.

High compression is desired when cold-starting. However, there is high oil pressure in the lubricant oil circuit when the motor is in the cold state, which would shorten the connecting rod and thus run counter to the desire for high compression. To avoid this problem, a provision can be made within the scope of the invention that the connecting device and/or the control plunger has at least one thermocouple.

It is especially advantageous if the connecting element of the connecting device is embodied as an axially displaceable tie rod that is preferably arranged so as to be normal to the longitudinal axis of the connecting rod and is divided axially—preferably in the vicinity of the control plunger, with the thermocouple being arranged between a first tie rod part and a second tie rod part, especially preferably between the first tie rod part and the control plunger.

The thermocouple has a shorter installation length in the cold state than in the warm state. Such thermocouples with a temperature-sensitive expanding material element such as oil, wax, hard paraffin, or metal as the expanding material are also used in thermostat valves of combustion engines, for example.

In the cold state, the thermocouple compensates for the high control pressure in the cold lubricating oil circuit, which is how a shortening of the connecting rod and thus a reduction in compression during cold starts is avoided. As a result of the contracted expanding material of the thermocouple, the length of the connecting element is shortened, which is why the first valve does not open and the pressure is maintained in the first high-pressure chamber. Once the operating temperature is reached, the expanding material in the thermocouple expands, whereby the connecting element reaches the normal length that is required to actuate the first valve. The desired compression values can now be set based on the control by the engine characteristic map. For example, high compression is set for the low-load range, and lower compression is set for the high-load range.

The combustion engine is usually operated under a partial load and with high compression just before being switched off. When the engine is shut down, the high compression that is desired for the cold start has been set.

In order to prevent oil from being pressed out of the first high-pressure chamber by the weight of the piston after an extended idle period, a spring element that acts in the direction of the connecting rod extension can be arranged between the first and second rod parts, in which case the spring element is embodied as a disc spring. The second rod part of the connecting rod is held in its upper position by the spring element.

When the length of the connecting rod is adjusted, pressure waves may occur in the hydraulic system that can lead to an unwanted adjustment of the control device on the one hand and to disadvantageous influences or damage in the rest of the oil system of the vehicle on the other hand. To prevent this, a provision is made in an especially preferred embodiment of the invention that at least one first throttle device is arranged in the first oil passage or in the first hydraulic channel and/or at least one second throttle device is arranged in the second oil passage. By means of the throttle devices, it is possible to prevent any returning pressure waves or at least to reduce them to a harmless level. A throttle device can be provided in one or both of the two oil passages.

In order to enable quick filling of the high-pressure chambers despite the throttle devices, a provision can be made in another embodiment of the invention that the first throttle device and/or the second throttle device can be bypassed by a first bypass channel and/or a second bypass channel, in which case a first bypass valve or a second bypass valve is preferably arranged in the first bypass channel and/or second bypass channel. The first or second bypass valve can be embodied as a check valve that opens toward the respective high-pressure chamber.

Another design variant of the invention makes a provision that the control device, along with valve body and connecting device, is embodied as a module and arranged in a housing that can be pushed as a unit into a corresponding cavity in the first or second rod part. Depending on the design or arrangement of the displacement axis of the connecting element, the unit can be pushed into the cavity toward or parallel to the longitudinal axis of the connecting rod, with housing and cavity being preferably substantially cylindrical. Any oil supplies into the interior of the module can be ensured by circumferential grooves and associated oil supply openings that lead to the cavity.

These and other features follow not only from the claims and description, but also from the drawings, with it being possible for each of the individual features to be realized alone or together in the form of subcombinations in an embodiment of the invention, and to constitute an advantageous and in its own right patentable embodiment, for which protection is likewise claimed insofar as it is technically expedient.

The invention is explained in further detail in the following on the basis of non-restrictive exemplary embodiments, which are illustrated in the figures.

Figure 4:
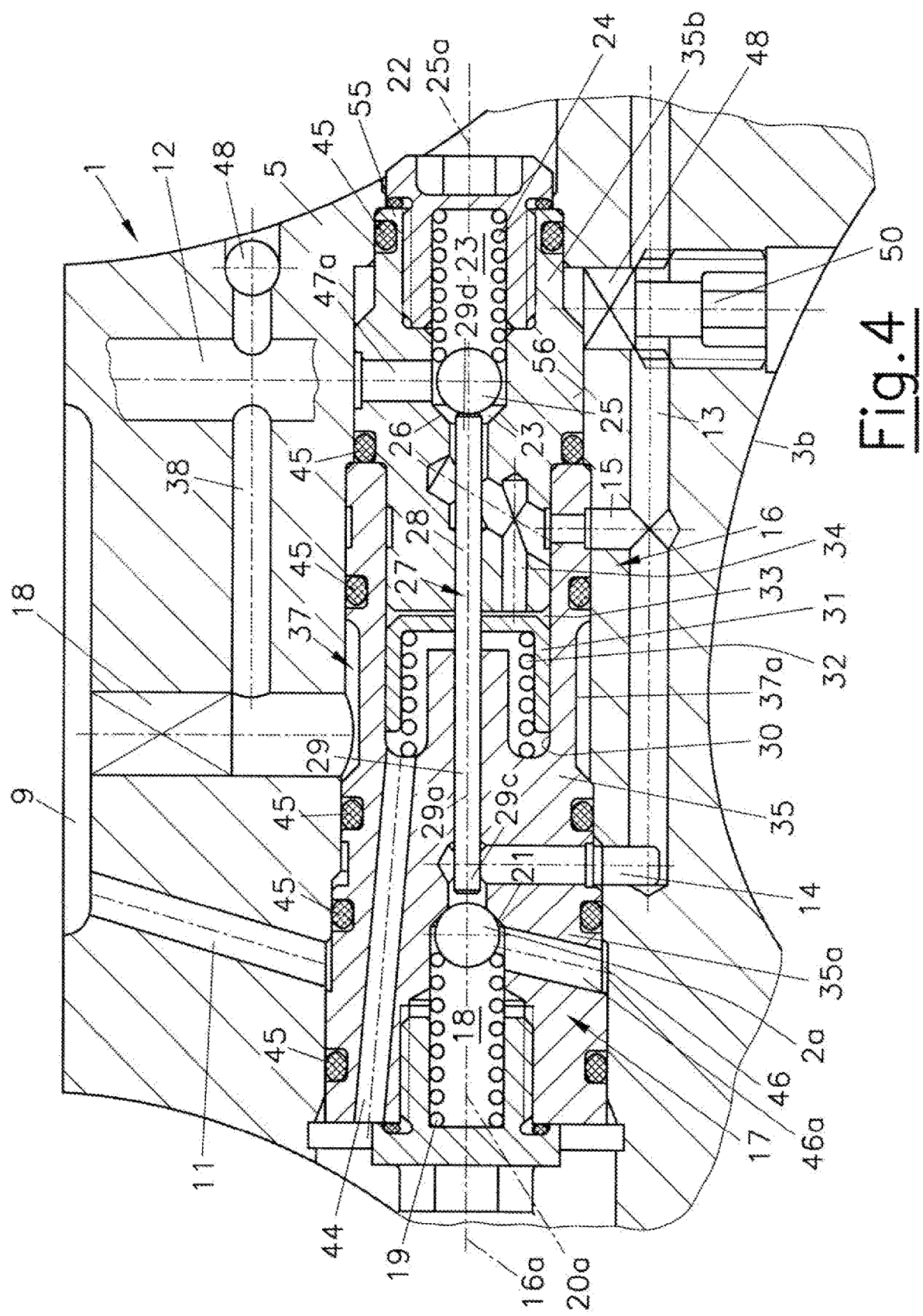
Figure 5:
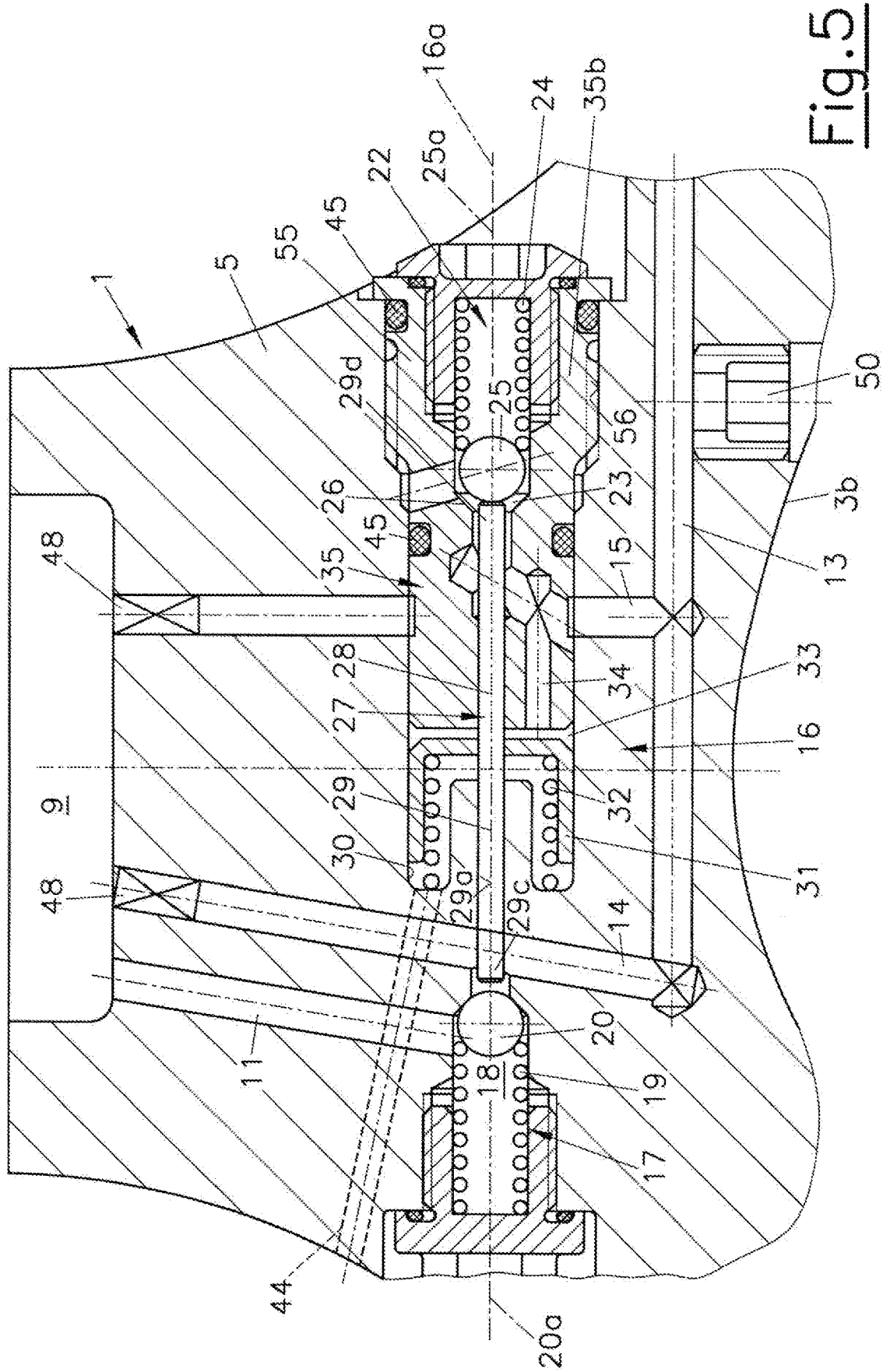
Figure 6:
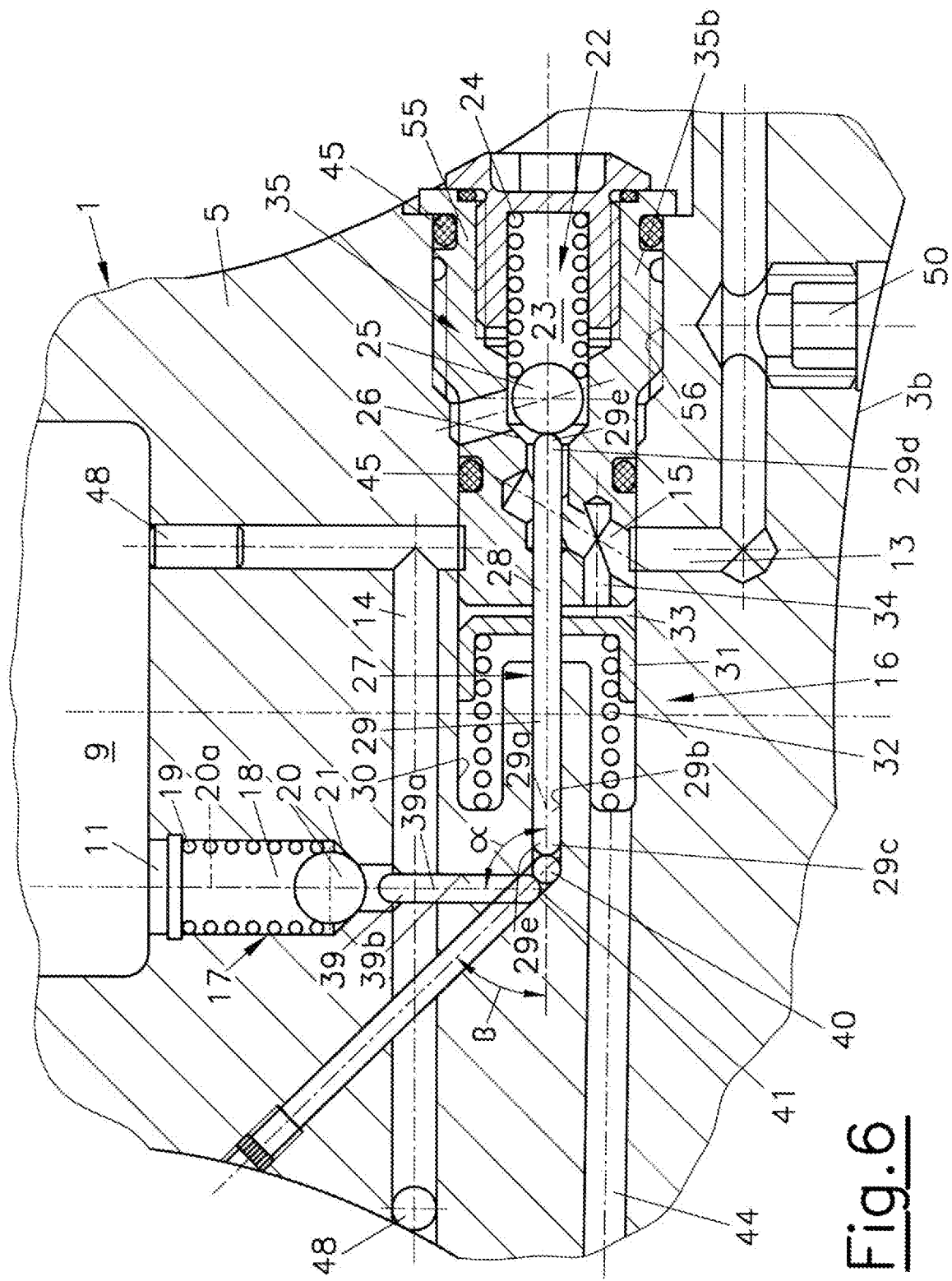
Figure 7:
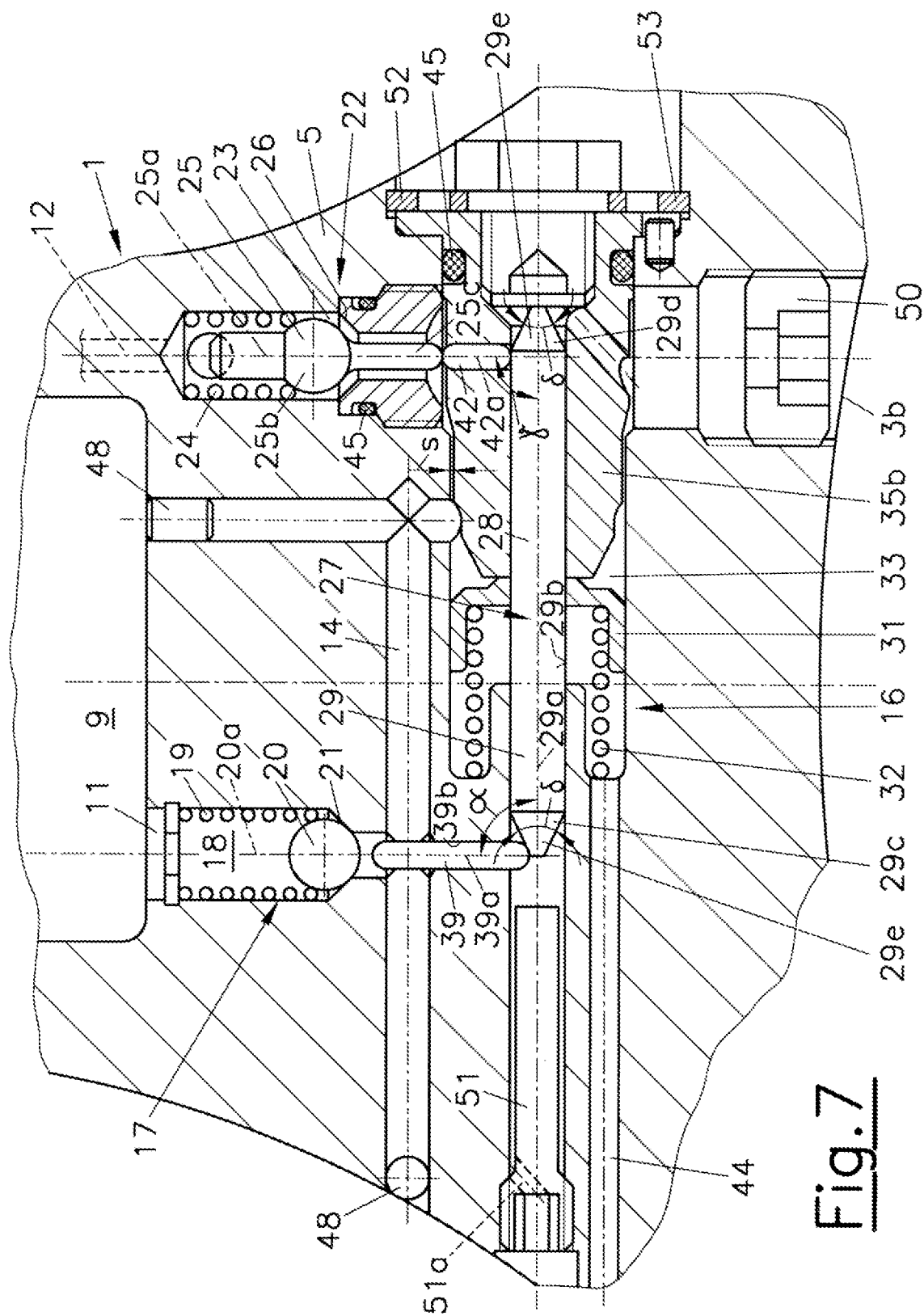
Figure 8:
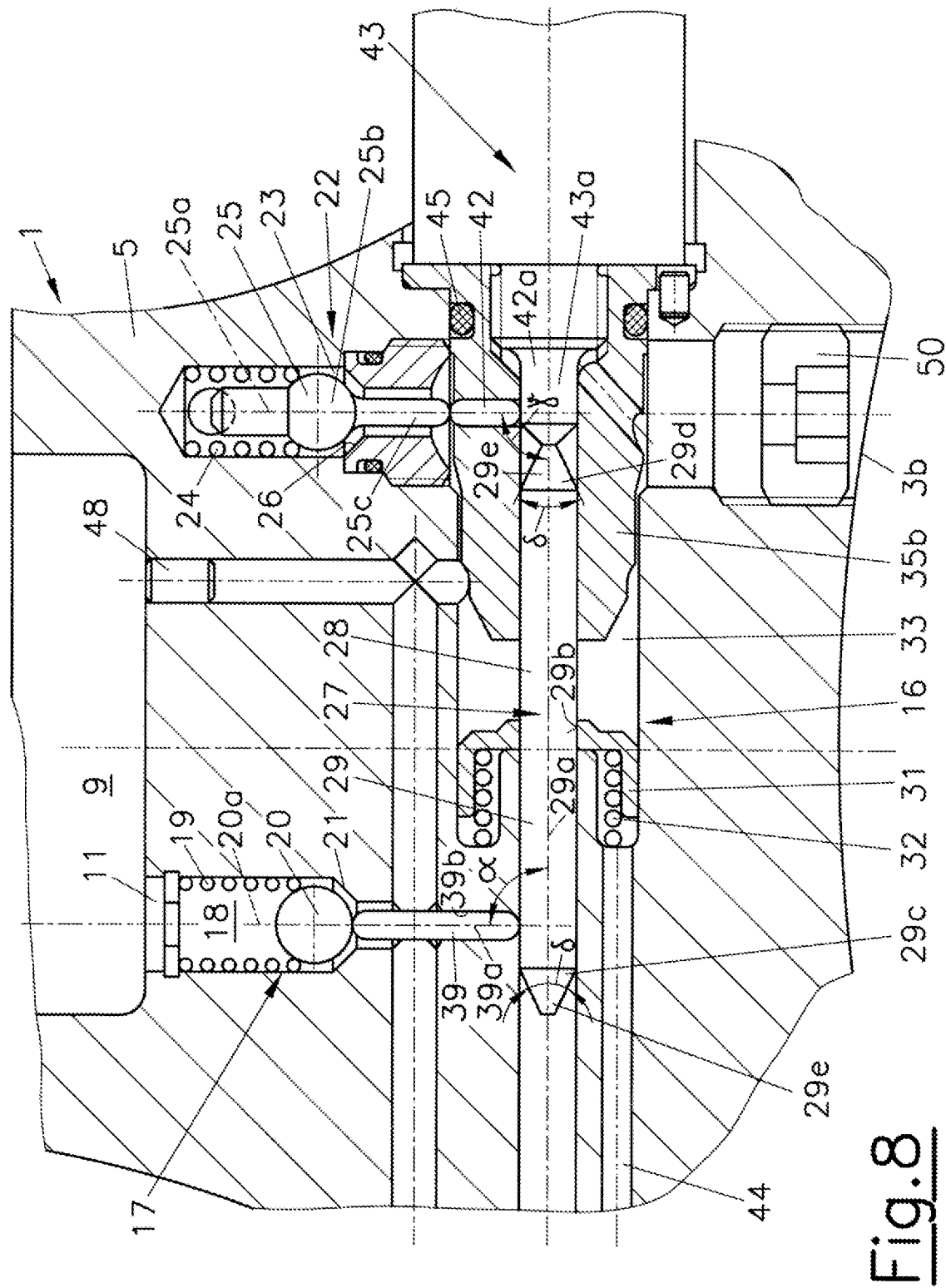
Figure 9:
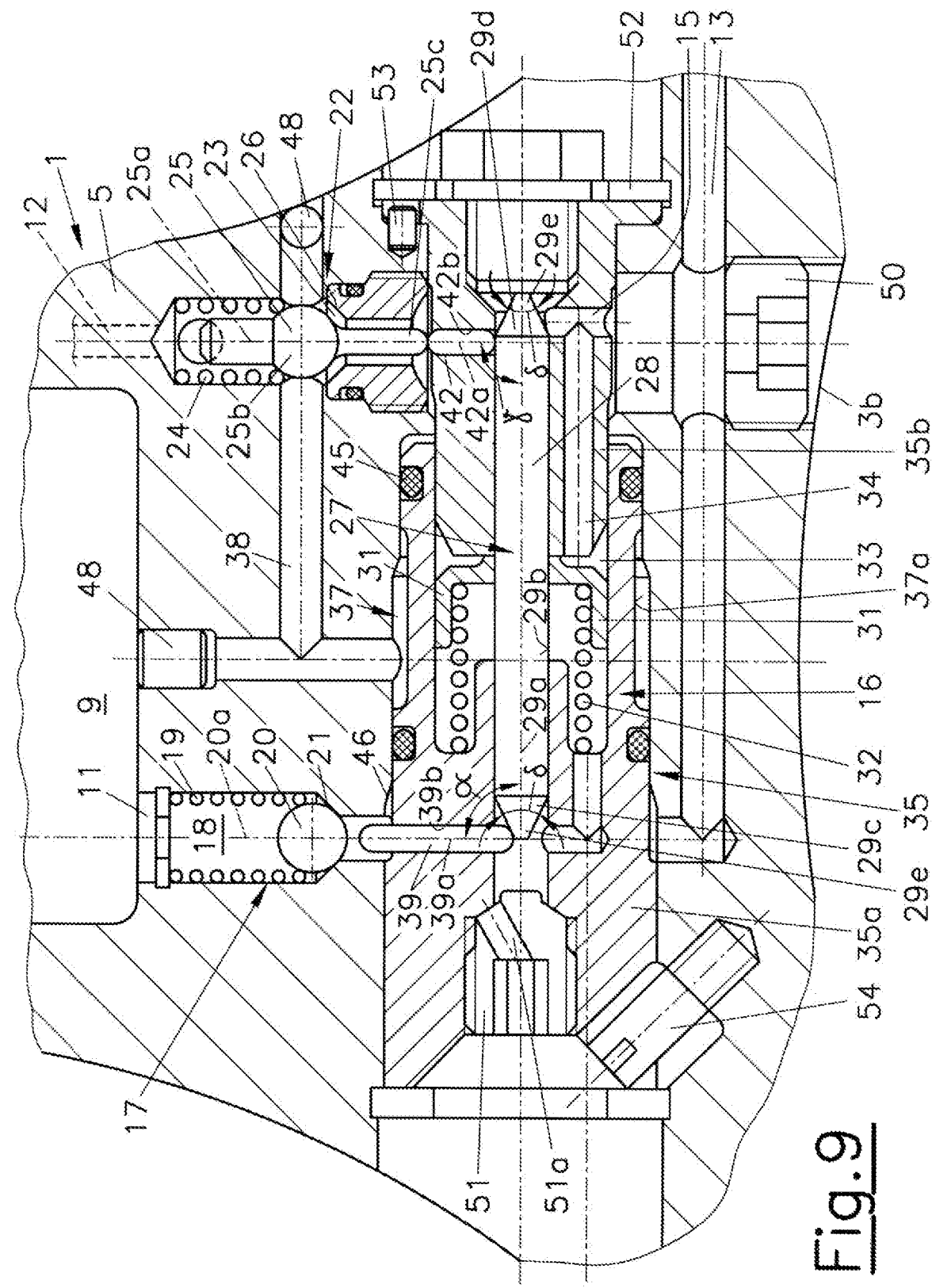
Figure 10:
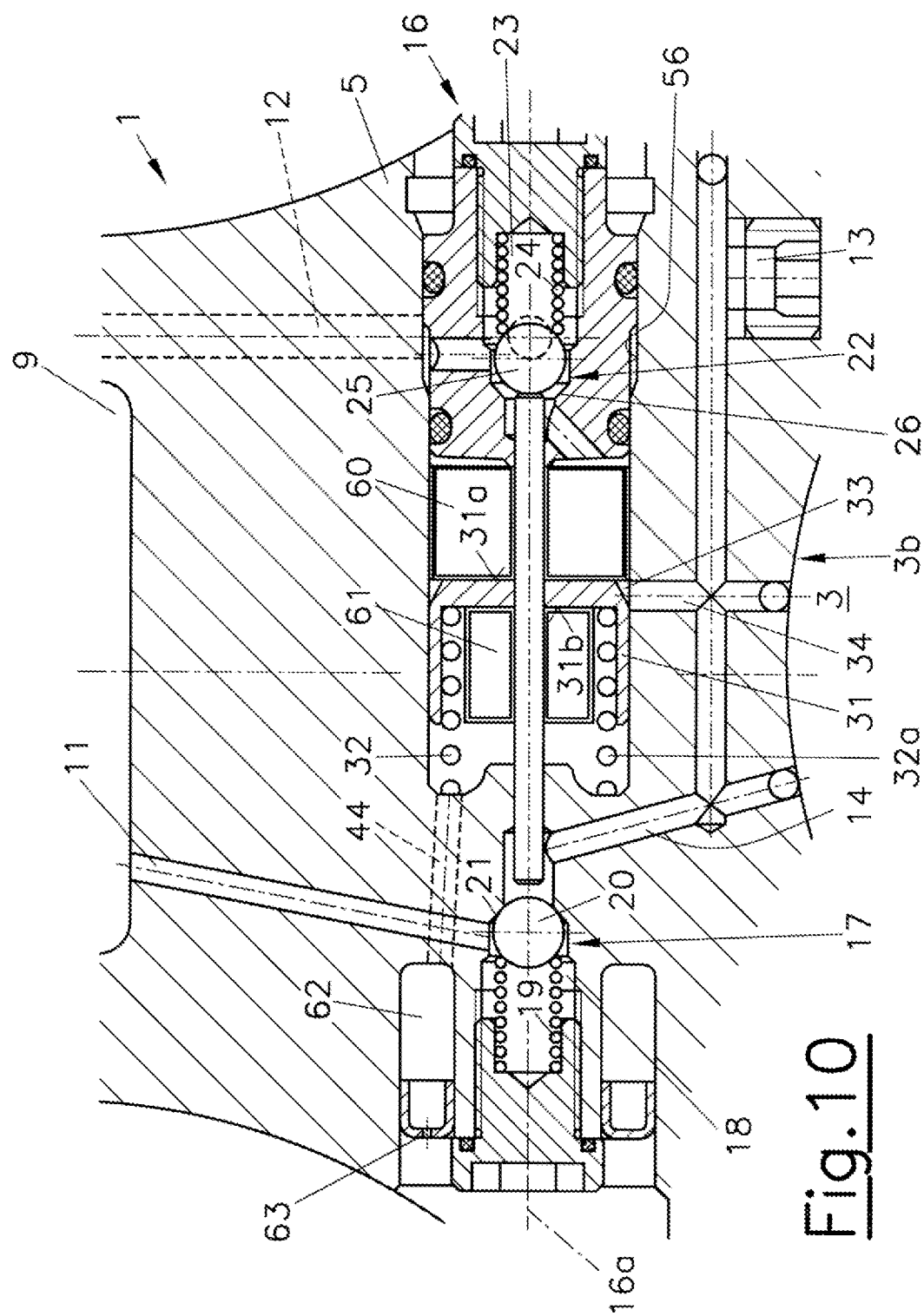
Figure 11:
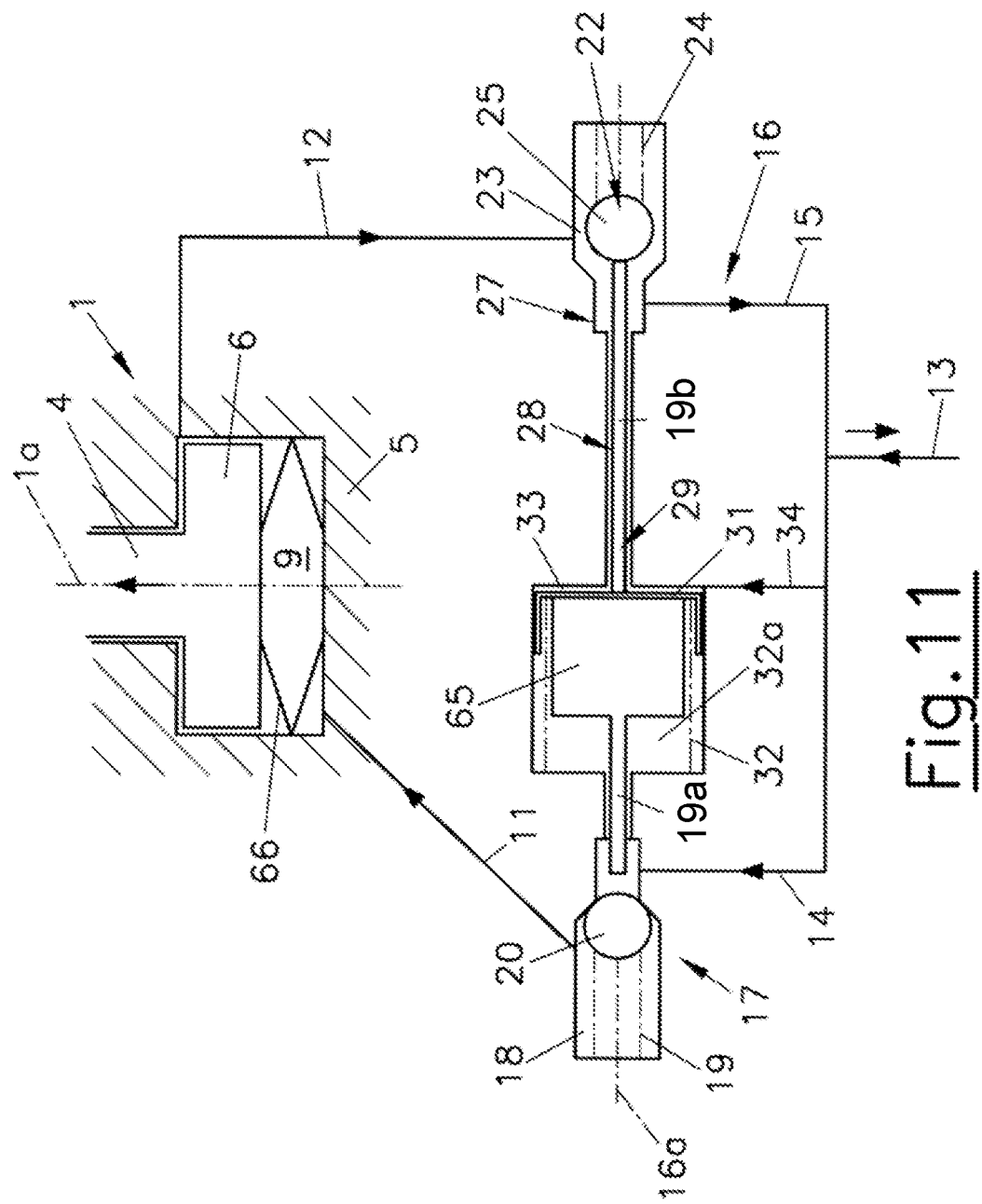
Figure 12:
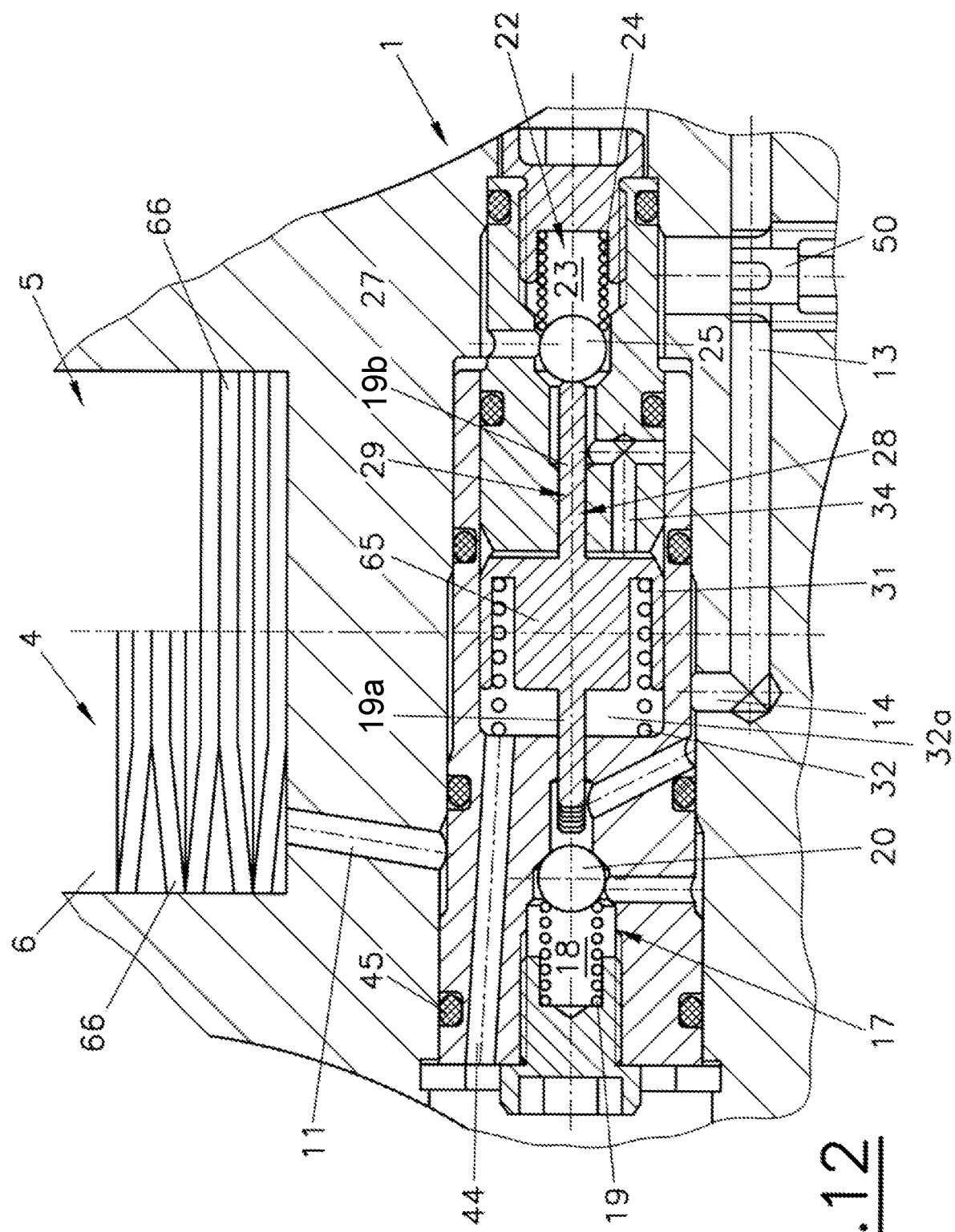

FIG. 1 shows a connecting rod according to the invention in a longitudinal section, FIG. 2a shows a schematic control device for a connecting rod according to the invention in a first switching position, FIG. 2b shows this schematic control device in a second switching position, FIG. 3 shows a control device for a connecting rod according to the invention in a first design variant, FIG. 4 shows a control device for a connecting rod according to the invention in a second design variant, FIG. 5 shows a control device for a connecting rod according to the invention in a third design variant, FIG. 6 shows a control device for a connecting rod according to the invention in a fourth design variant, FIG. 7 shows a control device for a connecting rod according to the invention in a fifth design variant, FIG. 8 shows the control device from FIG. 7 in a disassembly position, FIG. 9 shows a control device for a connecting rod according to the invention in a sixth design variant, FIG. 10 shows a control device for a connecting rod according to the invention in a seventh design variant, FIG. 11 shows a schematic representation of control device for a connecting rod according to the invention in an eighth design variant, and FIG. 12 shows a practical embodiment of the eighth design variant shown schematically in

Figure 14:
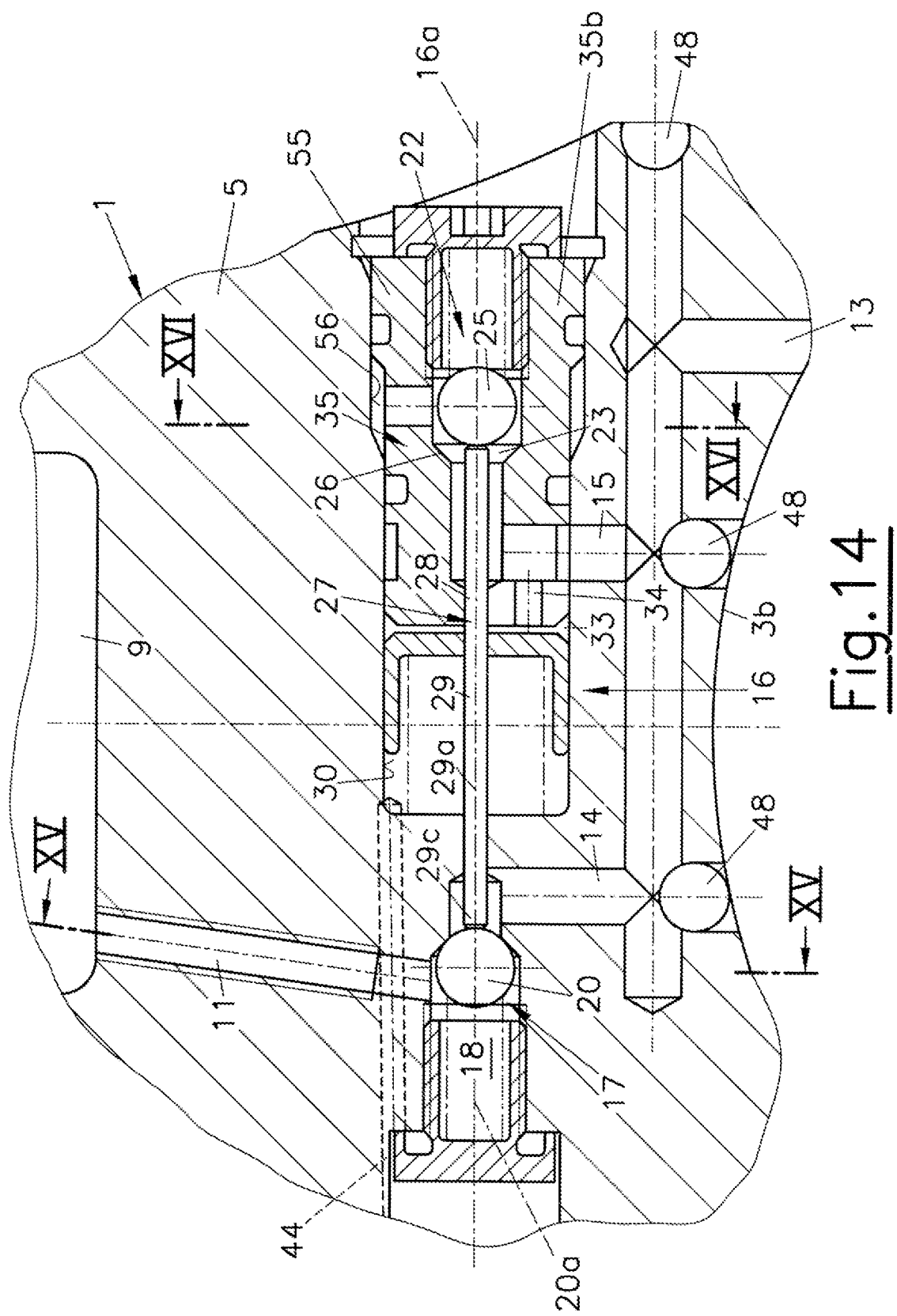
Figure 19:
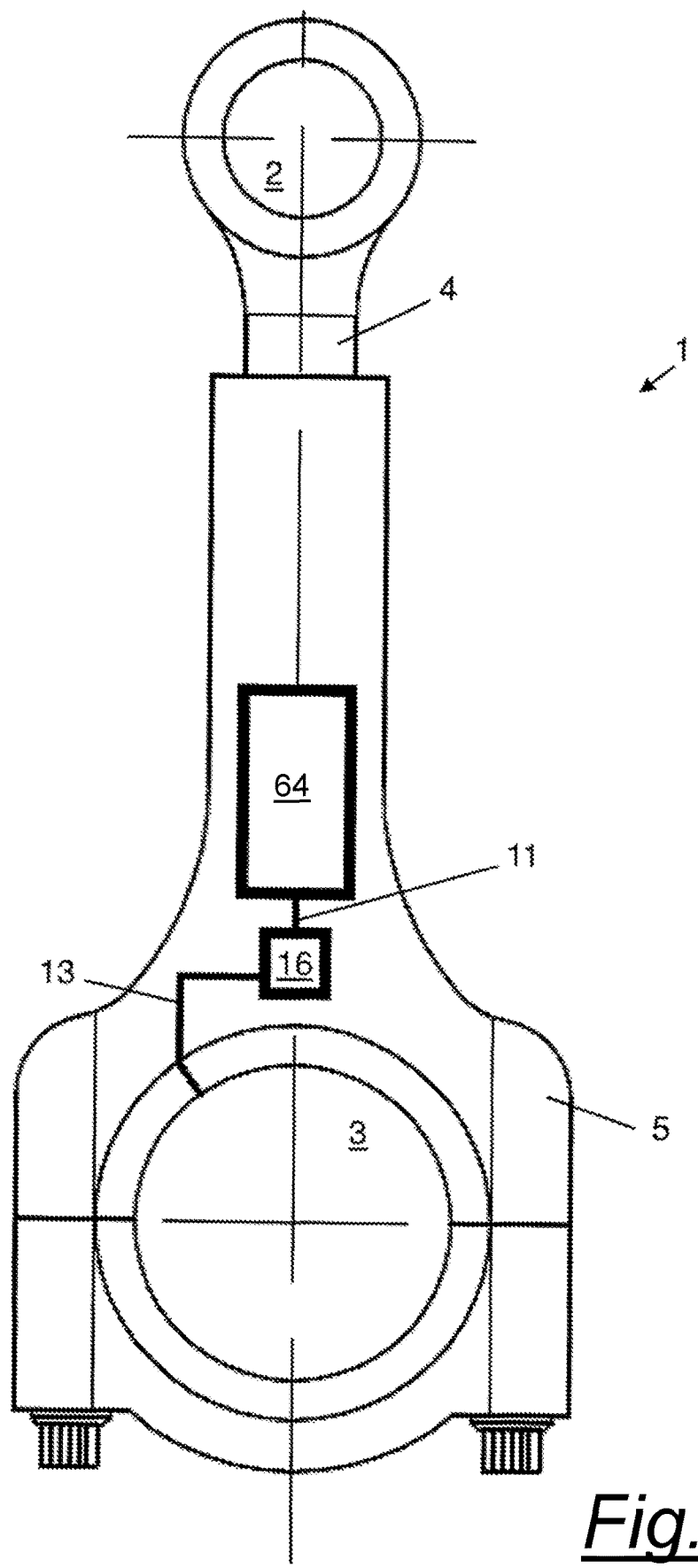
Figure 20B:
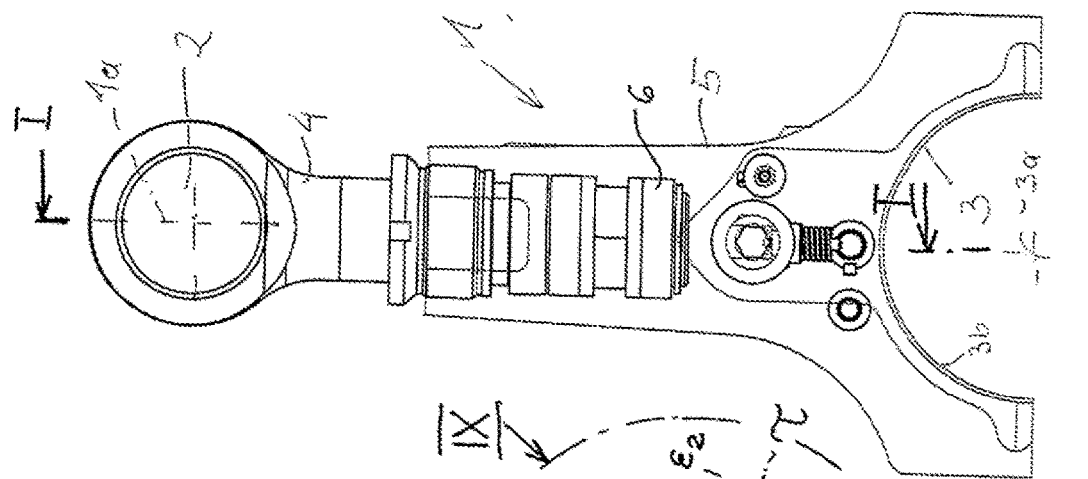
Figure 20A:
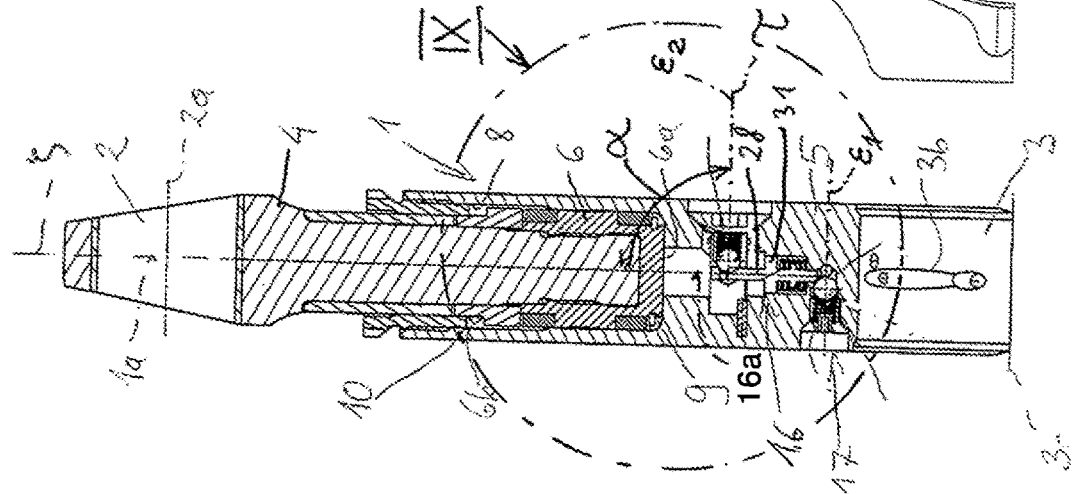
Figure 22:
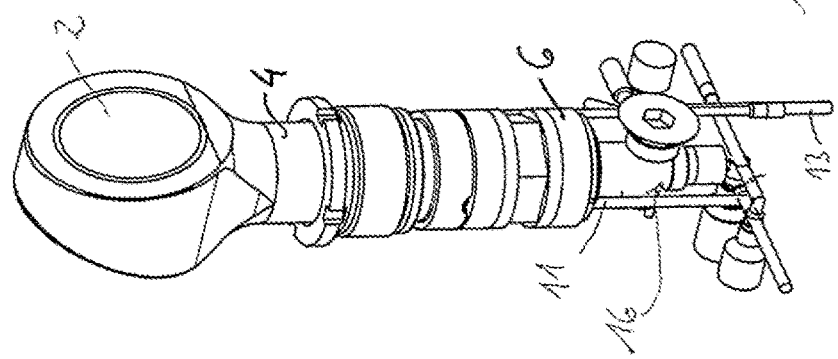
Figure 21:
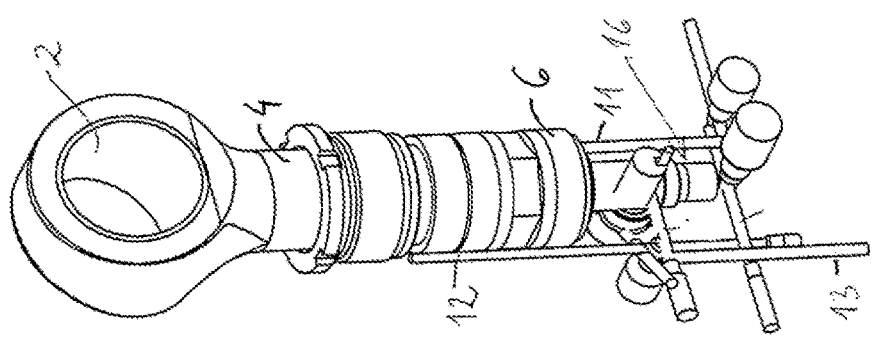
Figure 24:
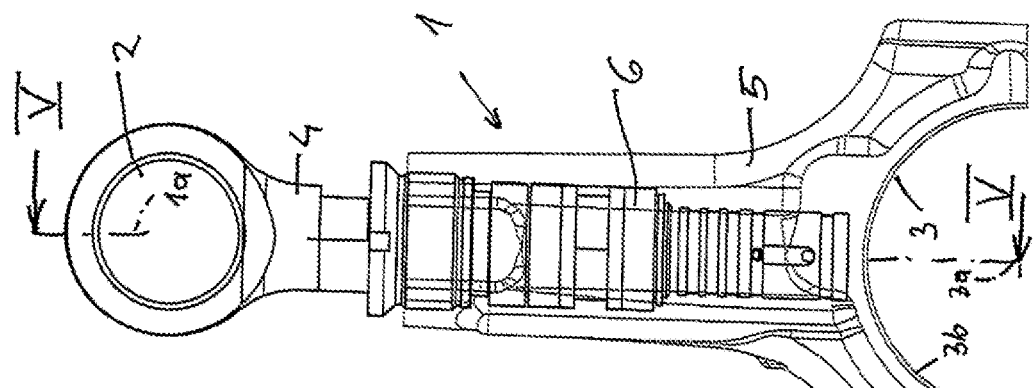
Figure 23:
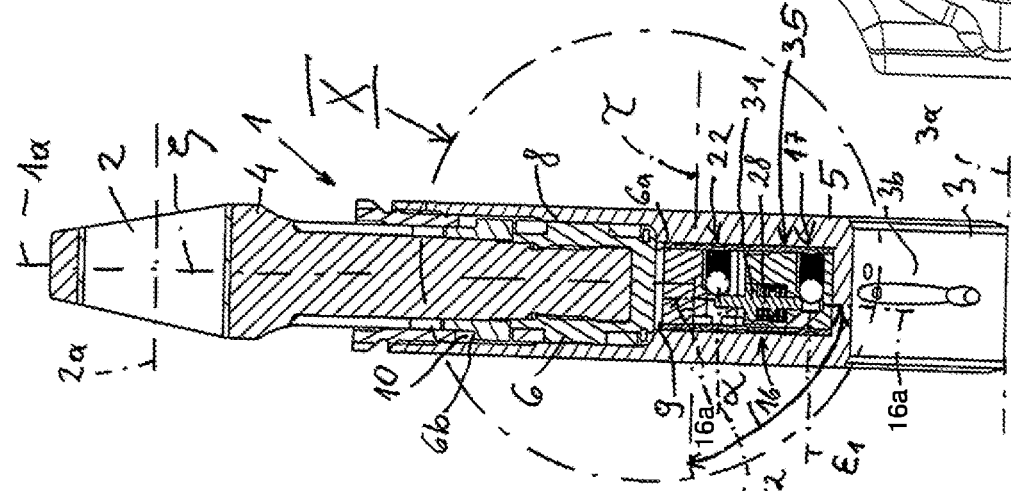
Figure 26:
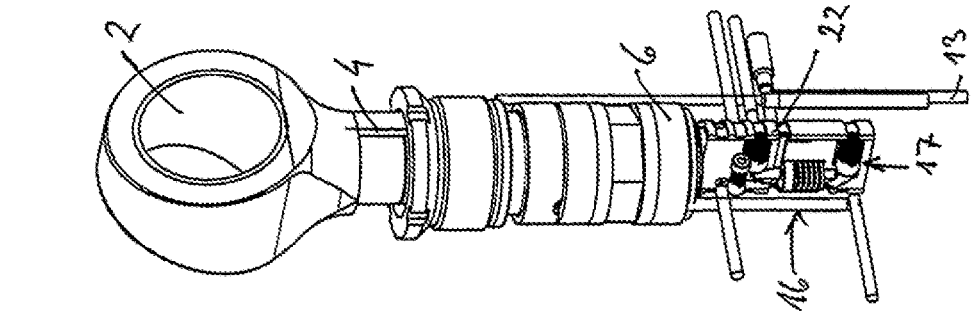
Figure 25:
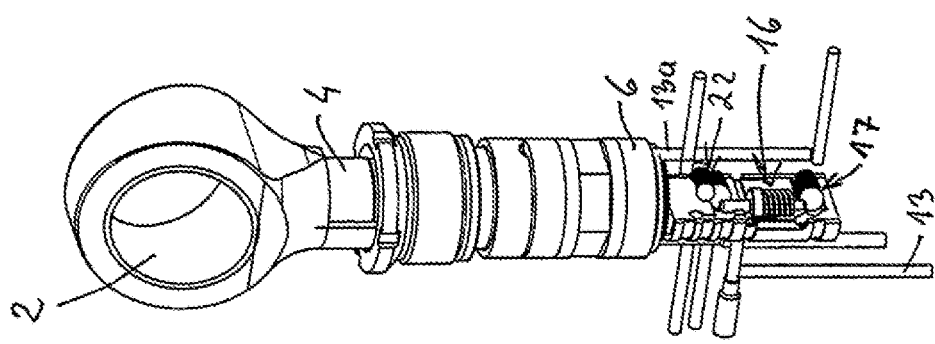
Figure 29:
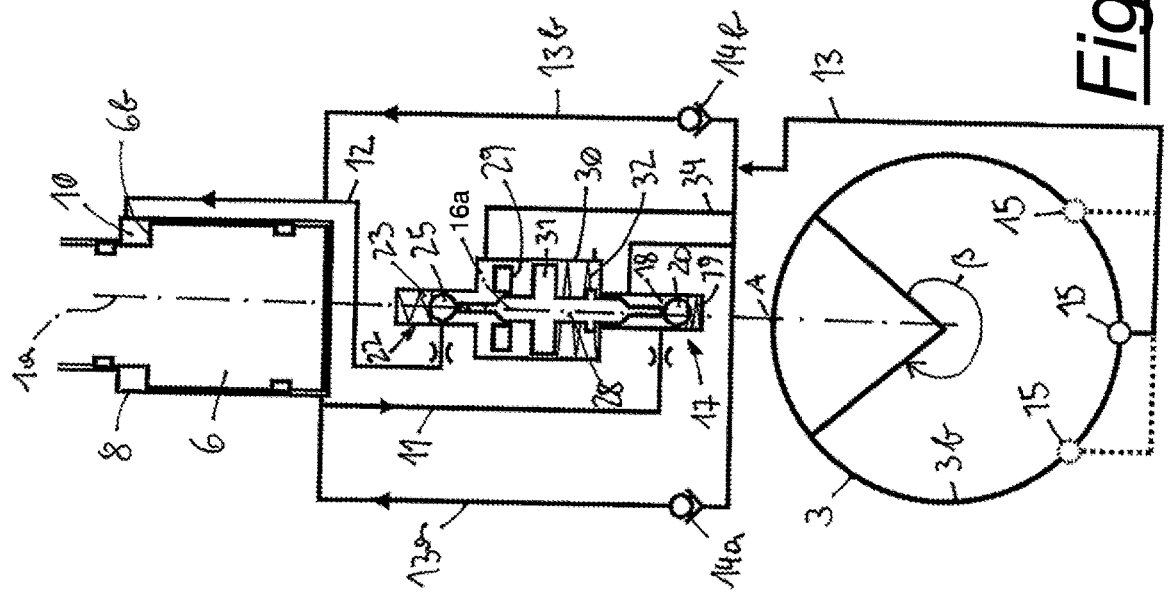
Figure 30:
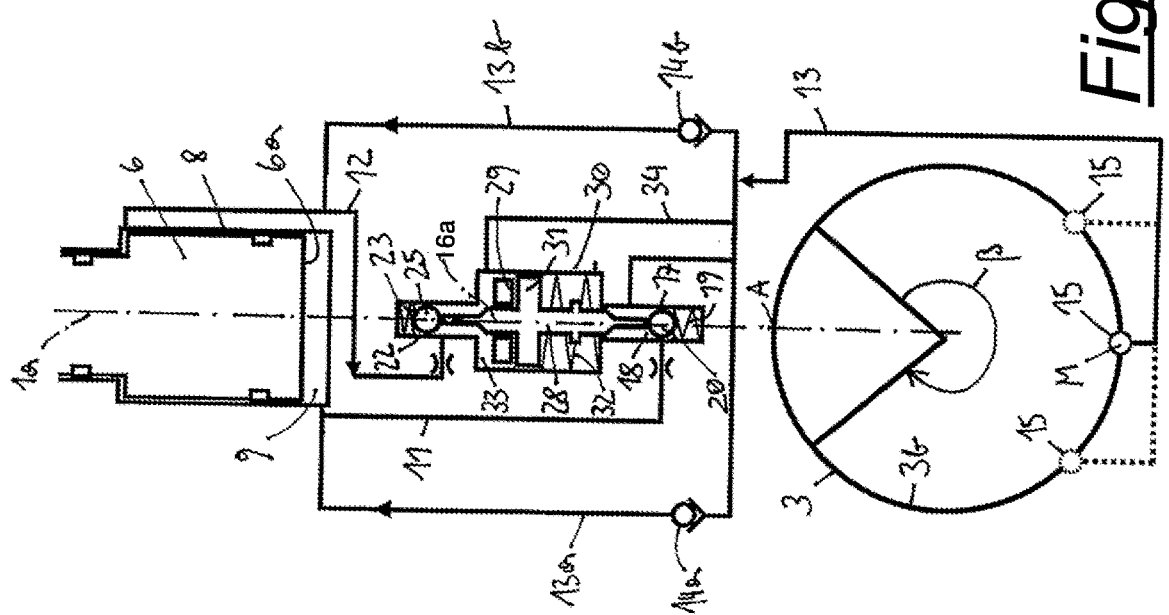
Figure 31:
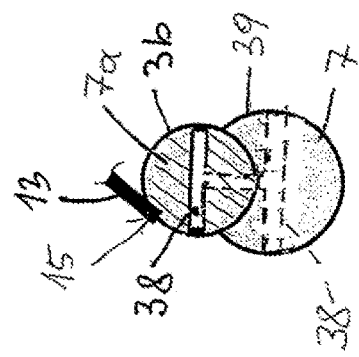
Figure 32:
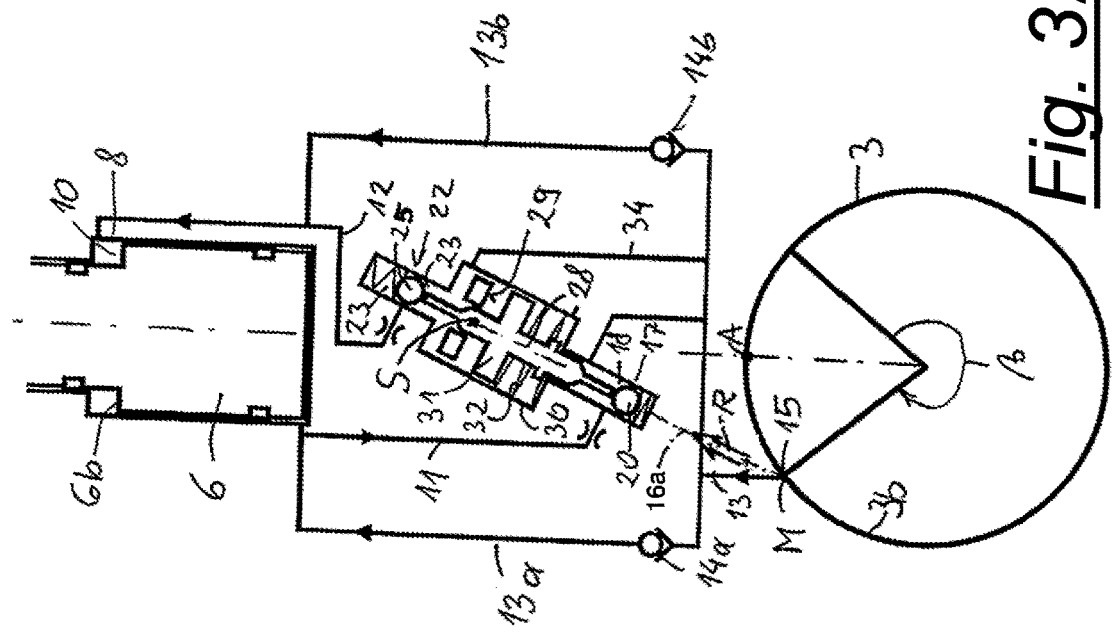
Figure 33:
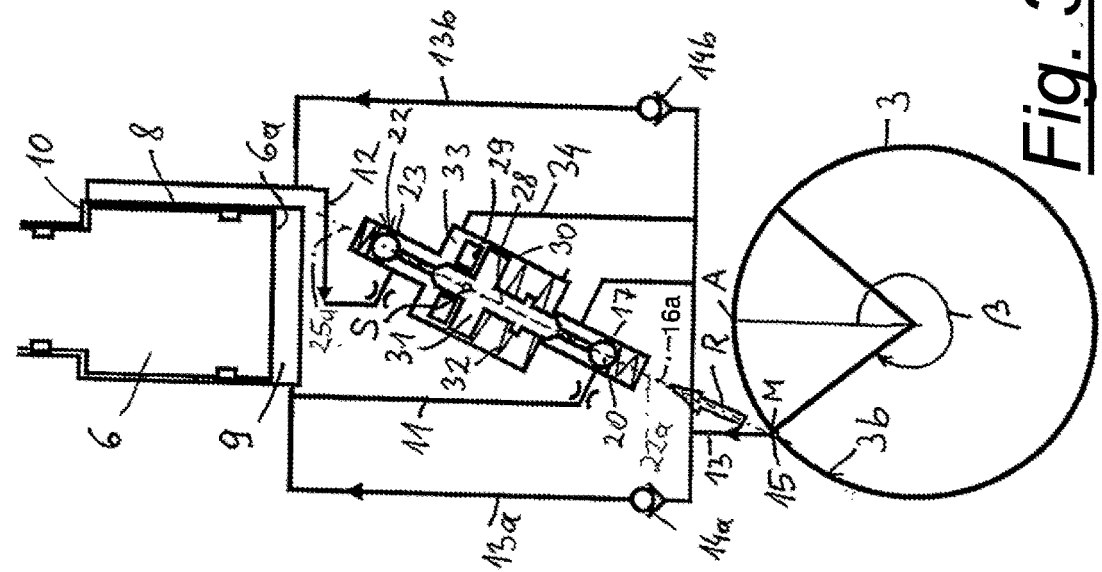
Figure 34:
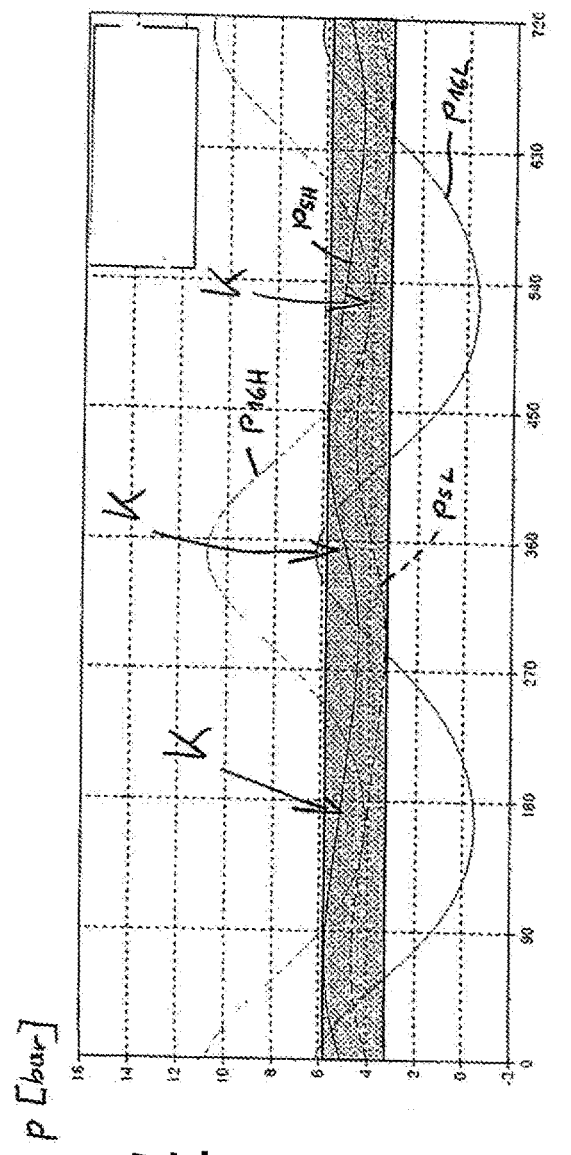
Figure 35:
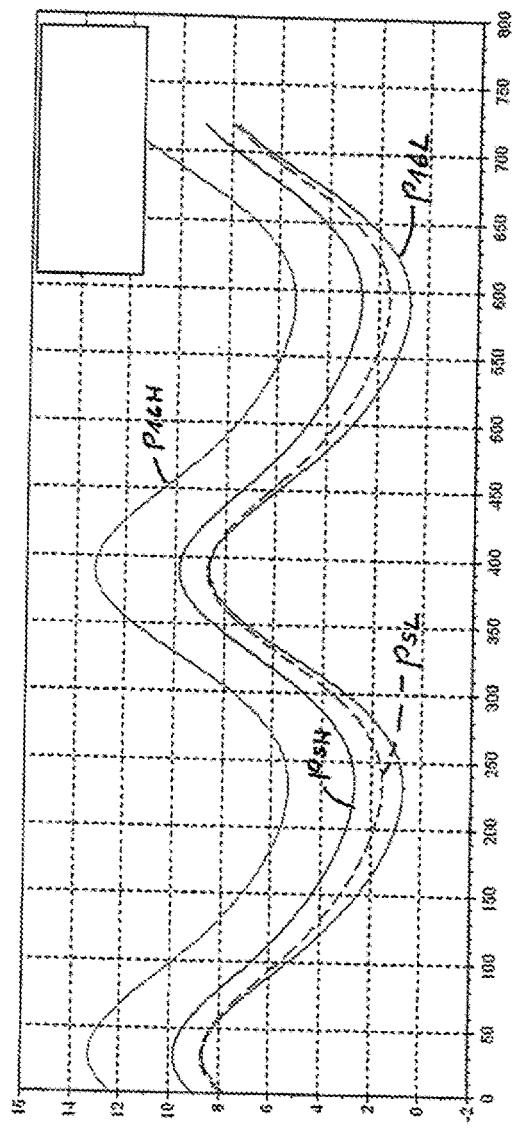

FIG. 11,

FIG. 13 shows a schematic control device for a connecting rod according to the invention in a ninth design variant, FIG. 14 shows a practical embodiment of the ninth design variant shown schematically in FIG. 13, FIG. 15 shows this connecting rod in a section along lines XV-XV in FIG. 14, FIG. 16 shows this connecting rod in a section along lines XVI-XVI in FIG. 14, FIGS. 17 and 18 show the relative displacements of the rod parts and the pressures in the high-pressure chambers over the crank angle for various engine speeds, FIG. 19 shows a schematic view of a connecting rod according to the invention, FIG. 20a shows a connecting rod according to the invention in a tenth design variant in a longitudinal section along line I-I in FIG. 20b, FIG. 20b shows a first rod part of this connecting rod in a top view complete with the contour of the second rod part, FIG. 21 shows a first rod part of the connecting rod from FIG. 20a complete with control device in an oblique view, FIG. 22 shows a first rod part of the connecting rod from FIG. 20a complete with control device in another oblique view, FIG. 23 shows a connecting rod according to the invention in an eleventh design variant in a longitudinal section along line V-V in FIG. 24, FIG. 24 shows a first rod part of this connecting rod in a top view complete with the contour of the second rod part, FIG. 25 shows a first rod part of the connecting rod from FIG. 23 complete with control device in an oblique and partially sectional view, FIG. 26 shows a first rod part of the connecting rod from FIG. 23 complete with control device in another oblique and partially sectional view, FIG. 27 shows detail IX from FIG. 20a, FIG. 28 shows detail X from FIG. 23, FIG. 29 shows a schematic representation of a control device for a connecting rod according to the invention in a twelfth design variant in a first switching position, FIG. 30 shows a schematic representation of the control device from FIG. 29 in a second switching position, FIG. 31 shows a schematic representation of a control device for a connecting rod according to the invention in a thirteenth design variant in a first switching position, FIG. 32 shows a schematic representation of the control device from FIG. 31 in a second switching position, FIG. 33, in a section through the crank pin of a crankshaft, shows a schematic view of the region from which the hydraulic medium supply channel extends, FIG. 34 shows pressure on the connecting element/crank angle diagram of a length-adjustable connecting rod according to the prior art, and FIG. 35 shows pressure on the connecting element/crank angle diagram of a connecting rod according to the invention.

Functionally equivalent parts are provided with the same reference symbols in the design variants that are illustrated in the figures.

FIG. 1 shows a two-piece connecting rod 1 for a reciprocating piston engine, for example a combustion engine, with a small end 2 of a connecting rod for a piston pin bearing (not shown in greater detail) and a big end 3 of a connecting rod for a crank pin bearing (not shown in greater detail) of a combustion engine. The axes of rotational symmetry of the small end and big end 2, 3 of the connecting rod are denoted by 2a and 3a, respectively. The longitudinal axis of the connecting rod 1 is denoted by 1a, and a median longitudinal plane—the oscillation plane—of the connecting rod 1 that is normal to the axes of rotational symmetry 2a and 3a of the small end and big end 2, 3 of the connecting rod and contains the longitudinal axis 1a of the connecting rod 1 is denoted by ε.

The connecting rod 1 has an upper first rod part 4 with the small end 2 of the connecting rod and a lower second rod part 5 with the big end 3 of the connecting rod. The first rod part 4 can be displaced in relation to the second rod part 5 between an extended position and a retracted position shown in FIG. 1 over an adjustment range AL toward the longitudinal axis 1a of the connecting rod 1. A substantially cylindrical piston member 6 is fastened in the upper first rod part 4 by means of a fastening screw 7 formed by a hexagon socket screw, for example.

The piston member 6 is guided in an axially displaceable manner in a guide cylinder 8 of the lower second rod part 5 of the connecting rod 1, with a first high-pressure chamber 9 being disposed between a first front face 6a of the piston member 6 facing toward the big end 3 of the connecting rod and the second rod part 5 in at least one position of the two rod parts 4, 5. The piston member 6, which is embodied as a step piston, has a second front face 6b that faces toward the small end 2 of the connecting rod and that borders a second high-pressure chamber 10 whose cylindrical lateral surface is formed by the guide cylinder 8 of the second rod part 5. In general, a "step piston" is understood as a piston—a "bilaterally acting piston" in the present case—with working surfaces of different sizes, with one of the working surfaces (in this case, the working surface that is oriented toward the second high-pressure chamber 10) being embodied as an annular surface and the other working surface being embodied as a circular surface. The different working surfaces enable the pressure conditions described herein to be achieved.

The annular first and second front faces 6a, 6b form pressure application surfaces for a pressurized actuating medium, for example motor oil, that is conducted into the high-pressure chambers 9, 10.

A first oil passage 11 leads into the first high-pressure chamber 9, and a second oil passage 12 leads into the second high-pressure chamber 10.

The oil supply of the first and second oil passage 11, 12 is provided via the oil supply passage 13, which extends from the connecting-rod bearing 3b of the bid end 3 of the connecting rod and is thus fluidly connected to the crank pin bearing (not shown), as well as to the connecting channels 14, 15 that are connected to the oil supply passage 13.

In order to control the pressures in the first and second high-pressure chambers 9, 10, a control device 16 is provided in the connecting rod 1, specifically in the lower second rod part 5, that has a first valve 17 with a first valve chamber 18 in the flow path between the first connecting channel 14 and the first oil passage 11, in which a first valve body 20 is pressed by a preloaded first valve spring 19 against a first valve seat 21. The first oil passage 11 leads into the first valve chamber 18. Moreover, the control device 16 has a second valve 22 with a second valve chamber 23, in which a second valve body 25 that is preloaded by a second valve spring 24 is pressed against a second valve seat 26, with the second oil passage 12 leading into the second valve chamber 23. Moreover, the control device 16 has a connecting device 27 between the first valve 17 and the second valve 22 with at least one connecting element 28, which is formed in the exemplary embodiments by a tie rod 29 that is arranged normally to the longitudinal axis 1a, particularly on a median longitudinal plane c of the connecting rod 1. The connecting element 28 is firmly connected to a control plunger 31 that can be displaced in a control cylinder 30. The control plunger 31, which is spring-loaded by a return spring 32, borders a control chamber 33 into which a control line 34 leads which is connected to the oil supply passage 13 or the connecting channel 15. The valve bodies 20, 25 and the connecting device 27 are separate components. As a result, the connecting device 27 is spaced apart from the second valve body 25 in at least a first displacement position of the connecting element 28 shown in FIG. 2a, and from the first valve body 20 in a second displacement position shown in FIG. 2b.

The first and second valve bodies 20, 25 of the first and second valves 17, 22 are preferably constituted by spheres.

By means of the valve bodies 20, 25 of the first and second valves 17, 22, the fluid connections between the first feed channel 14 and the first oil passage 11 on the one hand and between the second feed channel 15 and the second oil passage 12 on the other hand are opened or closed. The control plunger 31, which is made of plastic, for example, is actuated by the oil pressure of the combustion engine.

When the oil pressure—under a light load, for example—is maintained below a defined response pressure (1.8 bar, for example), the control plunger 31 remains in its second position as shown in FIG. 2b, because the spring force of the return spring 32 is greater than the force on the front face of the control plunger 31 resulting from the oil pressure in the control line 34. In this case, the tie rod 29—which is firmly connected to the control plunger 31 by a force fit, for example—keeps the valve body 25 open for the connection to the second high-pressure chamber 10 via the second oil passage 12, while the first valve body 20 of the first valve 17 remains closed for the connection to the first high-pressure chamber 9 by means of the first valve spring 19.

During the lifting movement, an inertial force acts on the connecting rod 1 in the vicinity of top dead center of the piston (not shown) and pulls the first rod part along with piston 6—as seen in FIGS. 1, 2a, and 2b—and thus the small end upward. This sucks in oil via the first valve 21, which is actually closed, through the lifting of the first valve body 20 against the restorative force of the first valve spring 19 due to the suction effect occurring in the first high-pressure chamber 9; the lower first high-pressure chamber 9 thus fills with oil via the first oil passage 11, while oil is pressed out of the upper second high-pressure chamber 10 into the second oil passage 12. The connecting rod 1 thus becomes longer. The flow of oil in the oil passages 11, 12 is shown by arrows in FIG. 2b.

When the oil pressure rises to a higher level under a greater engine load, the return spring 32 of the control plunger 31 is compressed, and the control plunger 31 moves to a left stop of the control cylinder 30.

In this position, the tie rod 29 pushes up on the first valve body 20 of the first valve 17, which connects the lower first high-pressure chamber 9 to the oil supply passage 13. As a result, the oil is able to flow out of the first high-pressure chamber 9 into the oil supply passage 13 and thus further along in the oil supply system. Since the tie rod 29 is lifted away from the second valve body 25 and the second valve body is thus pressed on the second valve seat 26 by the restorative force of the second valve spring 24, the second valve 22 is closed; during every ignition, the piston 6 is pressed downward and oil is sucked into the second high-pressure chamber 10 by the suction effect in the second high-pressure chamber 10 via the second valve 22, which is actually closed, by the second valve body 25 being lifted against the force of the second valve spring 24 until the second high-pressure chamber 10 is filled with oil. The flow of the oil is indicated by arrows in FIG. 2a. The connecting rod 1 is shorter in this position.

If the oil pressure in the oil system is reduced further, the return spring 32 of the control plunger 31 expands (FIG. 2b) and the control plunger 31 moves to the right (looking at FIG. 2b), with the second valve 22 opening for the second high-pressure chamber 10 and the first valve 17 closing for the first high-pressure chamber 9. The first high-pressure chamber 9 is pumped up again in the described manner as a result of the inertial forces acting on the second rod part and the piston member 6 at top dead center of the piston, and the connecting rod 1 becomes longer again.

Various design variants of the control device 16 will be explained below with reference to FIGS. 3 to 9.

FIG. 3 shows a first design variant corresponding to the schematic representations from FIGS. 2a and 2b, in which the first lift axis 20a of the first valve body 20 of the first valve 17 and the second lift axis 25a of the second valve body 25 of the second valve 22 are arranged so as to be coaxial with the longitudinal axis 29a of the tie rod 29.

The control device 16 has a housing 35 that is inserted and fixed in the second connecting rod part 5. The housing 35 has a guide member 35a for the tie rod 29 in the vicinity of the first valve 17 and a guide member 35b for the tie rod 29 in the vicinity of the second valve 22, with the first valve 17 being arranged in the guide member 35a and the second valve 22 being arranged in a guide member 35b in the embodiment shown in FIG. 3. In the embodiments shown in FIGS. 3, 4, 5, 6, 10, 12, and 14, the guide member 35b is formed by the valve housing 55 of the second valve 22, which valve housing 55 is inserted and fixed in a receiving hole 56 of the second rod part 5. The displacement rod 29 or tie rod 29 is displaceably supported in the two guide members 35a, 35b. The control cylinder 30 receiving the control plunger 31 is formed by the guide member 35a. In the vicinity of the first oil passage 11, the guide member 35a has an annular space 46 for supplying the first high-pressure chamber 9 with oil that fluidly connects to the first valve chamber 18 via a radial borehole. Analogously, a circumferential annular space 47 is also worked in the guide member 35b in the vicinity of the second oil passage 12 that is fluidly connected via a radial borehole to the second valve chamber 23.

In the example shown in FIG. 3, the first connecting channel 14 and the control line 34 are arranged in the guide member 35a, and the second connecting channel 15 is arranged in the guide member 35b.

An annular gap 36 formed between the guide member 35a and the first rod part 4 has the function of connecting the oil supply passage 13 that is arranged in the first rod part 4 to the first connecting channel 14 and the control line 34 that leads to the control chamber 33. Optionally, a throttle 49 can be arranged between the second connecting channel 15 and the control chamber 33. Furthermore, a throttle 50 can be arranged in the oil supply passage 13 that extends from the connecting-rod bearing 3b.

The housing 35, which consists of the two guide members 35a, 35b and has the integrated connecting channels 14, 15 and the integrated control line 34, has the advantage that either no or only few adaptations need to be made in order to integrate a control device of a connecting rod according to the invention into the first rod part 4 of a known connecting rod that is designed for a valve spool, so that the manufacturing cost, particularly the costs of alterations in the manufacturing process, can be kept very low.

Reference symbol 44 denotes a ventilation line for ventilating and aerating the control chamber 33 and to discharge leakage oil. The ventilation line 44 can have a restriction 44a (FIG. 13). Areas of the housing 35 that are under high pressure are sealed by means of O-ring seals 45. Boreholes that are required for production engineering reasons are sealed with seal plugs 48.

FIG. 4 shows an alternative second embodiment of the control device 16, which differs from FIG. 3 essentially through a clamping function for the control plunger 31.

In order to prevent the pressure wave upon opening of the second valve 22 for the second high-pressure chamber 10 from pressing the control plunger 31 to the left (when seen in FIG. 2b) and thereby reopening the other first valve 17, which seals the lower first high-pressure chamber 9, the housing 35 of the control device 16 receiving the control cylinder 30 is designed such that the pressure wave elastically constricts the housing wall of the control cylinder 30 in the vicinity of the control plunger 31. The guide member 35a of the housing 35 has an annular groove 37a that forms a constriction of the housing wall for this purpose in the vicinity of the control cylinder 30 and whose annular space 37 is connected to the second oil passage 12 via an intermediate channel 38. The wall thickness in this constricted region is selected such that the deformation of the housing wall surrounding the control cylinder 30 resulting from the pressure that is present in the annular space 37 of the annular groove 37a upon occurrence of a pressure wave is great enough to clamp the control plunger 31. Whenever there is high pressure in the second high-pressure chamber 10, the housing 35 is deformed such that the control plunger 31 is clamped and effectively prevented from being displaced by pressure waves. When the control plunger 31 is clamped through the deformation of the housing 35, the first valve 17 therefore cannot be opened by the control plunger 31.

The control movement can therefore only occur in the pressureless phases—that is, with respect to the described exemplary embodiment, in phases in which the second valve 22 in particular, which is fluidly connected via the second hydraulic channel 12 to the second high-pressure chamber 10, is not open, preferably in phases in which none of the valves is open.

Furthermore, in FIG. 4, the connecting channels 14, 15 are arranged partially in the first rod part 4 and partially in the housing 35.

FIG. 5 shows a third variant in which the first valve chamber and the control cylinder are formed directly by the first rod part 4.

FIG. 6 shows a fourth variant in which the first lift axis 20a of the first valve body 20 is arranged so as to be inclined at a first angle α of about 90°+1-60° with respect to the longitudinal axis 29a of the tie rod 29. Specifically, in the exemplary embodiment, the first lift axis 20a is arranged so as to be normal to the longitudinal axis 29a of the tie rod 29, but the second lift axis 25a of the second valve body 25 is arranged so as to be coaxial with the longitudinal axis 29a of the tie rod 29. At least one axially displaceable, substantially rod-shaped first transmission element 39 is arranged between the first valve body 20 and the tie rod 29, with the longitudinal axis 39a of the transmission element 39 being preferably arranged so as to be coaxial with the first lift axis 20a of the first valve body 20.

In order to deflect the movement of the tie rod 29 to the first valve body 20 or the first transmission element 39, a spherical deflection element 40 is arranged in a deviated borehole 41 that connects the receiving hole 29b of the tie rod 29 and the receiving hole 39b of the transmission element 39. The first deviated borehole 41 is arranged so as to be inclined at an angle β>0°, for example 45°, with respect to the longitudinal axis 29a of the tie rod 29 and to the first lift axis 20a of the first valve body 20. The tie rod 29 thus acts indirectly, that is, via the deflection element 39, on the transmission element 39. The tie rod 29 and/or the deflection element 40 can be made of a ceramic material, which ensures a high level of strength and low thermal expansion.

By virtue of the fact that the first lift axis 20a is arranged so as to be inclined with respect to the longitudinal axis of the tie rod 29 and parallel to the longitudinal axis 1a of the connecting rod, the lifting of the first valve body 20 as a result of inertial forces due to deceleration and acceleration movements of the connecting rod in the vicinity of the big end of the connecting rod during the crank movement can be prevented. The second valve 22 is less endangered by lifting movements, since stronger closing forces are at work near the maximum range of inertial forces as a sum of the oil pressure in the second high-pressure chamber 10 and the restorative force of the second valve spring 24 on the second valve body 25. Speeds of up to about 4000 RPM can thus be achieved without the danger of the lifting of the valve bodies 20, 25 as a result of inertial forces.

FIG. 7 shows a fifth design variant in which the second valve 22 is also arranged so as to be inclined with respect to the tie rod 29. Specifically, the second lift axis 25a of the second valve body 25 is arranged so as to be inclined at a first angle γ of about 90°+/−60° with respect to the longitudinal axis 29a of the tie rod 29. Concretely, in the exemplary embodiment shown in FIG. 7, both the first lift axis 20a of the first valve body 20 and the second lift axis 25a of the second valve body 25 are arranged so as to be normal to the longitudinal axis 29a of the tie rod 29. An axially displaceable, substantially rod-shaped first transmission element 39 is arranged between the first valve body 20 and the tie rod 29, and an axially displaceable, for example rod-shaped, second transmission element 42 is arranged between the second valve body 25 and the tie rod 29. The first displacement axis 39a of the first transmission element 39 is arranged so as to be coaxial with the first lift axis 20a, and the second displacement axis 42a of the second transmission element 42 is arranged so as to be coaxial with the second lift axis 25a.

Unlike in FIG. 6, the tie rod 29 acts directly on the first and second transmission element 39, 42 in the embodiment shown in FIG. 7. The ends 29c and 29d of the tie rod are cone-shaped or wedge-shaped, with the opening angle δ of the lateral surfaces 29e of the cone-shaped or wedge-shaped end 29c, 29d being 30°, for example. Upon displacement of the tie rod, the inclined lateral surfaces 29e cause the first and second transmission element 39, 42 and thus the corresponding first and second valve body 20, 25 to be deflected counter to the restorative force of the first and second valve spring 19, 24 toward the first and second lift axis 20a, 25a, respectively. A separate deflection element and a deviated borehole for receiving same are therefore not necessary here. In order to achieve the necessary stroke length of the valve bodies 20, 25, the thickness of the tie rod 29 should correspond to at least twice the stroke length of the valve bodies 20, 25.

The guide member 35b serves to guide the tie rod 29 and the second transmission element 42. A gap s (of 0.05 mm, for example) that may be annular, for example, is embodied between the guide member 35b and the first rod part and is used to supply the control chamber 33 and the two valves 17, 22 with oil while also acting as a throttle in order to prevent a pressure wave from getting into the system upon opening of the second valve 22. The guide member 35b is fixed on the first rod part 4 by means of an internal circlip 52, for example, and held in its proper position and secured against rotation by means of an alignment pin 53.

The second valve body 25 of the second valve 22 is embodied as an elongated rotary part and has a peg-like extension 25c on the side of the second valve seat 26 beneath a spherical region 25b, with this peg-like extension contacting the second transmission element 42.

Reference symbol 51 denotes a stop element for the tie rod 29 that has a vent opening 51a in order to enable ventilation and leakage into the crankcase (not shown). The stop element 51 prevents the tie rod 29 from disengaging in the region of the second end 29d and the second transmission element 42 from disengaging during adjustment, and prevents the transmission element 42 from falling into the receiving hole 29b of the tie rod 29.

As is shown in FIG. 8, a suitable tool 43 can be screwed into the housing 35 on the front side for the purpose of disassembling the control device 16, so that the tie rod 29 can be pushed to the left in FIG. 8 counter to the restorative force of the return spring 32 until the tie rod 29 and a pin 43a of the tool 43 completely push the transmission elements 39, 42 radially out of the receiving hole 29b of the tie rod 29. The pin 43a holds the second transmission element 42 in the pushed-out position and prevents the second valve spring 24 from pressing the second transmission element 42 into the guide member 35b, which would impede disassembly thereof. After the tool 43 has been screwed in, the housing 35 can thus be pulled with the tool 43 out of the first rod part 4.

As in FIGS. 7 and 8, in the sixth design variant, which is shown in FIG. 9, the lift axes 20a, 25a of the first and second valve bodies 20, 25 are arranged so as to be inclined with respect to the longitudinal axis 29a of the tie rod 29. However, this sixth embodiment differs from the fifth embodiment in that—as in FIG. 4—a clamping function is provided for the control plunger 31. Here as well, in the vicinity of the first valve 17 a guide member 35a of the housing 35 is provided for this purpose which forms the control cylinder 30 for receiving the control plunger 31. An annular groove 37a forming an annular space 37 is formed on the outer periphery in the vicinity of the control cylinder 30, with this annular space 37 being fluidly connected via one or more connecting channels 38 to the second oil passage 12 and additionally to the second high-pressure space 10. Whenever there is high pressure in the second high-pressure chamber 10, the guide member 35a of the housing 35 is deformed in the vicinity of the control cylinder 30 such that the control plunger 31 is clamped and effectively prevented from being displaced by pressure waves. Reference symbol 54 denotes a locking element for the positionally precise fixation of the guide member 35b.

The control device 16 has a number of parts that move back and forth in the direction of the displacement axis 16a of the control device 16, such as the control plunger 31, tie rod 29, and valve bodies 20, 25. The displacement axis 16a of the control device 16 is on the oscillation plane c and approximately normal to the longitudinal axis 1a of the connecting rod 1.

During the turning of the crankshaft, acceleration forces act on back-and-forth-moving parts of the control device 16, particularly on the control plunger 31 counter to the force of the return spring 32. Starting at a certain speed, the inertial forces acting on the control plunger 31 are so great that the force of the return spring 32 is ultimately exceeded and the control plunger 31 would be displaced counter to the restorative force due to the acceleration forces alone, which would result in a malfunctioning of the control device 16 and thus limit the speed range for the adjustment of the connecting rod 1.

To avoid this, at least one back-and-forth-moving part of the control device 16 can have at least one buoyancy body 60 or be embodied at least partially as a buoyancy body. The buoyancy body 60 can be embodied as a hollow body or as a closed-cell foam body. The control device 16 shown in FIG. 10 differs from the control device shown in FIG. 5 in that at least one back-and-forth-moving part of the control device 16 is provided with buoyancy bodies 60, 61.

As is shown in FIG. 10, at least one buoyancy body 60 can be arranged in the vicinity of the first front side 31a. Moreover, a buoyancy body 61 can also be arranged in the vicinity of the second front side 31b of the control plunger 31. In order for the buoyancy body 61 to float in the oil, defined leakages are provided between the control chamber 33 and the spring chamber 32a containing the return spring 32. That is, the control device 16 is configured such that oil or hydraulic medium can pass between the control chamber 33 and the spring chamber 32 as a result of the pressures that are present, particularly through small slots and gaps that are created because of appropriately and specifically selected tolerances and fits between the individual components, with the tolerances or fits being selected in such a way that the defined leakages are produced. In particular, the tolerances of control cylinder 30 and control plunger 31 are selected in such a way, or the fit between them is selected in such a way, that a defined leakage is produced and hydraulic medium can pass from the control chamber 33 into the spring chamber 32.

Moreover, the tie rod 29 and/or the valve bodies 20, 25 can be embodied as buoyancy bodies, for example as hollow bodies.

As can also be seen from FIG. 10, the spring chamber 32a is connected via the ventilation line 44 to a storage chamber 62, which is connected via a throttle 63 to the crank chamber of the crankcase (not shown). This enables oil to flow back into the crankcase chamber. The spring chamber 32a of the control plunger 31 is thus always filled with the oil, since sufficient oil can always be sucked out of the storage chamber 32 and/or through the leakages by virtue of the back-and-forth movements of the control plunger 31. The throttle 63 enables a damping of the movement of the control plunger 16, whereby an opening of the first valve 17 and thus of the first high-pressure chamber 9 due to a deflection of the control plunger 16 and the displacement rod 29 as a result of pressure waves returning from the second high-pressure chamber 10 can be prevented.

As a result of the slight play between control plunger 31 and control cylinder 30, slight—intentional—leakages occurs between the control chamber 33 and the spring chamber 32a, whereby the buoyancy bodies 60, 61 are always mostly surrounded by oil and float. This is where the known Archimedean principle, according to which the static buoyancy of a body in a medium is exactly equal to the weight of the medium displaced by the body, comes into play. The lateral acceleration force that would bring about a lifting of the control plunger 31 or of the return spring 32 is thus reduced substantially, so that malfunctions of the control device 16 can be avoided.

Through the use of the buoyancy bodies 60, 61, all of the exemplary embodiments described make it possible to substantially reduce the density of the overall system as well as the masses on which lateral accelerations act as a result of the rotation of the crankshaft. Through the use of the buoyancy bodies 60, 61—even without the force deflection of the connecting device 27 provided in FIGS. 6 to 8—engine speeds of far over 7000 RPM can thus be achieved without the need to limit the function of the length-adjustable connecting rod 1.

High compression is desired when cold-starting. However, there is high oil pressure in the lubricant oil circuit when the combustion engine is in the cold state, which would shorten the connecting rod 1 and thus run counter to the desire for high compression. FIGS. 11 and 12 show a solution whereby this problem can be avoided in which the connecting device 27 and/or the control plunger 31 has at least one thermocouple 65 that changes the effective length of the connecting device 27 as a function of the operating temperature.

The connecting element 28 of the connecting device 27 is embodied here as an axially displaceable, two-part tie rod 29 that is arranged so as to be normal to the longitudinal axis 1a of the connecting rod 1 and is axially divided in the vicinity of the control plunger 31, with the thermocouple 65 being arranged between a first tie rod part 19a and a second tie rod part 19b, particularly between the first tie rod part 19a and the control plunger 31.

The thermocouple 65 has a shorter installation length in the cold state than in the warm state. Thermocouples of this type have a temperature-sensitive expanding material element with oil, wax, hard paraffin, or metal, for example, as the expanding material.

In the cold state, the thermocouple 65 compensates for the high control pressure in the cold lubricating oil circuit, which is how a shortening of the connecting rod 1 and thus a reduction in compression when cold-starting is avoided. As a result of the contracted expanding material of the thermocouple 65, the length of the connecting element 28 is shortened, which is why the first valve 17 does not open and the pressure is maintained in the first high-pressure chamber 9. Once the operating temperature is reached, the expanding material in the thermocouple 65 expands, whereby the connecting element 28 reaches the normal length that is required to actuate the first valve 17. The desired compression values can now be set based on the control by the engine characteristic map. For example, high compression is set for the low-load range, and lower compression is set for the high-load range.

The combustion engine is usually operated under a partial load and with high compression just before being switched off. When the engine is shut down, the high compression that is desired for the cold start has been achieved.

In order to prevent oil from being pressed out of the first high-pressure chamber 9 by the weight of the piston after an extended idle period, a spring element 66 that acts in the direction of the connecting rod extension and can be embodied as a disc spring, for example, can be arranged between the first and second rod parts 4, 5 of the connecting rod 1.

The second rod part 5 of the connecting rod 1 is held in its upper position by the spring element 66.

FIG. 12 shows a practical embodiment, similar to that in FIG. 4, of the arrangement that is schematically illustrated in FIG. 11 with a thermocouple 65 in the divided tie rod 29 between the first tie rod part 19a and the control plunger 31 and a spring element 66 that is arranged in the first high-pressure chamber 9 between the first rod part 4 and the second rod part 5 of the connecting rod 1. The piston member 6 of the second rod part 5 is shown here in the left half of the figure in its upper position, which is associated with a high compression ratio, and in the right half of the figure in its lower position with compressed spring element 66, which is associated with a lower compression ratio.

FIG. 13 schematically illustrates a control device 16 which differs from FIGS. 2a and 2b in that a first throttle device 71 is arranged between the first valve 17 and the first high-pressure chamber 9 in the first oil passage 11. Moreover, a second throttle device 72 is arranged between the second valve 22 and the second high-pressure chamber 10 in the second oil passage 11. By means of the throttle devices 71 and 72, pressure waves can be attenuated which might deflect the control device 16, particularly open the valves 17, 22. In particular, during a length adjustment of the connecting rod 1, the propagation of pressure waves from the high-pressure chambers 9, 10 into the rest of the oil system of the vehicle and the resulting damage can be prevented.

In order to nonetheless enable quick filling of the first high-pressure chamber 9, the first throttle device 71 can be bypassed via a first bypass channel 73, with a first bypass valve 75 being arranged in the first bypass channel 73 that is formed by a check valve that opens toward the first high-pressure chamber 9, for example. The first bypass channel 75 can extend from the oil supply passage 13 or from the first connecting channel 14 and leads downstream from the first throttle device 71 into the first oil passage 11 or into the first high-pressure chamber 9. Analogously, the second throttle device 72 can be embodied so as to be bypassable through a second bypass channel 76, which extends from the oil supply passage 13 or from the second connecting channel 15 and leads downstream from the second throttle device 72 into the second oil passage 12. Moreover, a first bypass valve 75 can be arranged in the second bypass channel 74 that is formed by a check valve that opens toward the second high-pressure chamber 10, for example.

Variants are possible which have only one first throttle device 71 or a second throttle device 72, or both a first 71 and a second throttle device 72, each without a bypass channel 73, 74, or in combination with at least one bypass channel 73, 74. FIGS. 14 and 15 show one structural embodiment of the schema shown in FIG. 13.

FIGS. 16 and 17 show relative displacements h of the two rod parts 4, 5 in relation to one another, as well as the pressure profiles $p_9$ and $p_{10}$ in the first high-pressure chamber 9 and second high-pressure chamber 10, respectively, plotted over the crank angle KW for an extension and a shortening of the connecting rod 1, with a full-load operation of the combustion engine with an engine speed of 2000 RPM being shown in FIG. 17 and with a light-load operation of the combustion engine with an engine speed of about 4000 RPM being shown in FIG. 18. It is clear to see that, in FIG. 17, the maximum length (h=3 mm) of the connecting rod 1 is achieved after about four work cycles, and the minimum length (h=0 mm) of the connecting rod is achieved after one work cycle. In FIG. 18, the maximum length (h=3 mm) of the connecting rod 1 is achieved after about three work cycles, and the minimum length (h=0 mm) of the connecting rod is achieved after about five work cycles.

FIGS. 19, 20a, and 20b show a two-piece connecting rod 1 according to the invention for a reciprocating piston engine, for example a combustion engine, with a small end 2 of the connecting rod for a piston pin bearing (not shown in greater detail) and with a big end 3 of the connecting rod for a crank pin bearing (not shown in greater detail) of a combustion engine. The connecting rod 1 can be connected to a crankshaft by means of the big end 3 of the connecting rod. The axes of rotational symmetry of the small and big ends 2, 3 of the connecting rod are denoted by 2a and 3a, respectively. The longitudinal axis of the connecting rod 1 is denoted by 1a, and a median longitudinal plane—the oscillation plane—of the connecting rod 1 that is normal to the axes of rotational symmetry 2a and 3a of the small and big ends 2, 3 of the connecting rod and contains the longitudinal axis 1a of the connecting rod 1 is denoted by ζ in this case, with the designations ζ and ε being used synonymously in the following for the designation of the oscillation plane.

The connecting rod 1 has an upper first rod part 4 with the small end 2 of the connecting rod and a lower second rod part 5 with the big end 3 of the connecting rod. The first rod part 4 can be displaced in relation to the second rod part 5 between an extended position and a retracted position toward the longitudinal axis 1a of the connecting rod 1. A length-adjusting means 64 that can be charged with hydraulic medium, particularly oil, is provided for this purpose which can be embodied in various ways. The charging with hydraulic medium is performed here via hydraulic channels 11, 12 and a hydraulic medium supply channel 13, which are controlled by means of a control device 16. The exact design of the length-adjusting means 64 is not part of the invention, for which reason one possible exemplary embodiment will be described below. A substantially cylindrical piston member 6 is fastened therein on the upper first rod part 4. Other cross-sectional shapes of the piston member 6—in a polygonal shape, in the form of an ellipse, etc.—are also possible.

The piston member 6 is guided in an axially displaceable manner in a guide body 8 of the lower second rod part 5 of the connecting rod 1 that is cylindrical, for example (corresponding to the piston member 6—as mentioned above, other cross-sectional shapes are possible), with a first high-pressure chamber 9 being disposed between a first front face 6a of the piston member 6 facing toward the big end 3 of the connecting rod and the second rod part 5 in at least one position of the two rod parts 4, 5. The piston member 6, which is embodied as a step piston, has a second front face 6b facing toward the small end 2 of the connecting rod that borders a second high-pressure chamber 10 whose cylindrical lateral surface is formed by the guide body 8 of the second rod part 5. In general, a "step piston" is understood as a piston—a "bilaterally acting piston" in the present case—with working surfaces of different sizes, with one of the working surfaces (here: the working surface that is oriented against the second high-pressure chamber 10) being embodied as an annular surface and the other working surface being embodied as a circular surface. The different working surfaces enable the pressure conditions described herein to be achieved.

The annular first and second front faces 6a, 6b form pressure application surfaces for a pressurized actuating medium, for example motor oil, that is conducted into the high-pressure chambers 9, 10.

A first hydraulic channel 11 is connected to the first high-pressure chamber 9 and a second hydraulic channel 12 is connected to the second high-pressure chamber 10, as indicated in FIGS. 3 and 4.

The schematic diagram of the tenth and eleventh design variants shown in FIGS. 20a to 22 and 23 to 26 corresponds to the switching arrangement shown in FIGS. 29 and 30. FIGS. 29 and 30 essentially differ from FIGS. 20a to 26 merely through the arrangement of the lift axes 20a and 25a of the first 17 and second valves 22 which, in the tenth and eleventh design variants, are arranged so as to be normal to the longitudinal axis 1a or displacement axis 16a and, in the twelfth design variant, parallel to the longitudinal axis 1a or displacement axis 16a.

The oil supply of the first and second high-pressure chamber 9, 10 is provided via the hydraulic medium supply channel 13, which extends from the big end 3 of the connecting rod and is thus fluidly connected to the connecting-rod bearing 3b. The hydraulic medium supply channel 13 is divided into subchannels 13a, 13b, with the first subchannel 13a leading to the first high-pressure chamber 9 and the second subchannel 13b leading to the second high-pressure chamber 10. A check valve 14a, 14b is arranged in each of the subchannels 13a, 13b, with each check valve 14a, 14b releasing the throughput in the direction of the respective high-pressure chamber 9, 10 and blocking it in the opposite direction.

In order to control the pressures in the first and second high-pressure chambers 9, 10, a control device 16 is provided in the connecting rod 1, specifically in the lower second rod part 5, that has a first valve 17 with a first valve chamber 18, in which a first valve body 20 preloaded by a first valve spring 19 is pressed against a first valve seat 21. The first hydraulic channel 11 leads into the first valve chamber 18 via the first feed channel 13. Moreover, the control device 16 has a second valve 22 with a second valve chamber 23, in which a second valve body 25 that is preloaded by a second valve spring 24 is pressed against a second valve seat 26, with the second hydraulic channel 12 leading via a second feed channel 14 into the second valve chamber 23. Furthermore, the control device 16 has a connecting element 28 that is mounted so as to be displaceable along a displacement axis 16*a* between the first valve 17 and the second valve 22 and is formed substantially by a tie rod in the exemplary embodiments, which is firmly connected to a control plunger 31 that can be displaced in a control cylinder 30. The control plunger 31, which is spring-loaded by a return spring 32, borders a control chamber 33 into which a control line 34 leads which is connected to the hydraulic medium supply channel 13 (FIGS. 29 to 32). The valve bodies 20 and 25 and the connecting element 28 are separate components. First valve 17 and second valve 22 are arranged in the vicinity of different ends 28*a*, 28*b* of the connecting element 28.

The first and second valve bodies 20, 25 of the first and second valves 17, 22 are preferably constituted by spheres 20*b*, 25*b*. In order to enable the low-friction actuation of the spheres 20*b*, 25*b* by means of the connecting element 28 that is embodied as a tie rod 29, the ends 28*a*, 28*b* of the connecting element 28 are conically or spherically shaped.

In the first position, the first valve body 20, and in the second position, the second valve body 25 is lifted by the connecting element 28 counter to the restorative force of the valve spring 19, 24 from an associated first 21 and second valve seat 26, respectively, and the corresponding first 18 and second valve chamber 23 is fluidly connected to the hydraulic medium supply channel 13. In the respective other position, the first valve body 20 and the second valve body 25 rest on the first 21 and second valve seat 26, respectively, and block the fluid connection to the hydraulic medium supply channel 13. The displacement axis 16*a* of the connecting element 28 is on or inclined with respect to a normal plane T to the longitudinal axis 1*a* of the connecting rod 1.

In the tenth design variant shown in FIGS. 20*a* to 22 on the one hand and the eleventh design variant shown in FIGS. 23 to 26 on the other hand, the displacement axis 16*a* is respectively embodied so as to be inclined at an angle α of 90° with respect to a normal plane T to the longitudinal axis 1*a* or parallel to the longitudinal axis 1*a* of the connecting rod 1. The first lift axes 20*a* and second lift axes 25*a* are aligned in the direction of the crankshaft axis (not shown), i.e., so as to be normal to the oscillation plane of the connecting rod 1. In the first exemplary embodiment (FIGS. 20*a* to 22, 27), first valve 17 and second valve 22 are arranged on different sides; in the eleventh exemplary embodiment, on the other hand (FIGS. 23 to 26, 28), they are arranged on the same side of the oscillation plane or on a plane that runs through the displacement axis 16*a* and is parallel to the oscillation plane As the speed of the crankshaft of the combustion engine increases, the oil column in the supply lines to the control device 16 has a disadvantageous effect, impeding the control of the length adjustment. Depending on the speed and geometry, accelerations of points near the big end of the connecting rod reach several thousand g.

In order to prevent disturbances from occurring in the control of the length adjustment at higher speeds of the combustion engine, it is advantageous if the displacement axis 16*a* forms an angle α>0° with the normal plane T to the longitudinal axis 1*a* of the connecting rod 1. The angle α can be a maximum of 90°.

Especially good results can be achieved if the angle α is between 30° and 60°, particularly between 40° and 50. In this variant (see FIGS. 31 and 32), the extraction 15 of the connecting-rod bearing 3*b* where the hydraulic medium supply channel 13 ends is also advantageously arranged at a peripheral angle β of about 315°. Moreover, the force component parallel to the connecting rod axis 1*a* of the return spring 32 of the connecting element 28 points toward the small end 2 of the connecting rod. Negative influences on the displacement element 28 as a result of the inertia of the hydraulic oil in all oil-conducting hollow spaces of the connecting rod 1 and the inertial forces of the displacement element 28 can thus be compensated for. It is especially advantageous if the displacement axis 16*a* is arranged so as to be parallel to or coincide with an oil resultant R. "Oil resultant R" is understood here to refer to the oil column between the extraction point 15 in the connecting-rod bearing 3*b* of the big end of the connecting rod and its point of action on the control device 16; in one variant of the invention, the oil resultant is conducted toward the control device 16 through a connecting line between the extraction point in the connecting-rod bearing 3*b* (the hole center in the case of an extraction hole) and the operative position of the oil column. Due to the fact that the displacement axis 16*a* is parallel to or coincides with the oil resultant R, the inertial force of the oil column between the extraction in the connecting-rod bearing 3*b* and the point of action on the control device 16 can be compensated for by the inertial force of the displacement element. In addition, the material and weight of the control device 16 must be coordinated in order to minimize negative influences. In FIGS. 31 and 32, the oil resultant R is drawn in as a connecting line between the hole center M of the extraction 15 in the connecting-rod bearing 3*b* of the big end 3 of the connecting rod on the one hand and the intersection S between the displacement axis 16*a* of the connecting element 28 and the stop surface 29 for the connecting element 28 facing toward the return spring 32. The return spring 32 is arranged such that a force component of the restorative force that is aligned parallel to the longitudinal axis 1*a* of the connecting rod 1 acts in the direction of the small end 2 of the connecting rod.

The arrangement of the displacement axis 16*a* of the connecting element 28 in relation to the oil resultant R thus enables the phases of the oscillatory movements of the oil column and of the connecting element 28 to be harmonized. The amplitude of the oscillations is compensated for through adaptation of the mass of the connecting element 28 such that the inertial force of the connecting element 28 is equivalent to the inertial force of the oil column. Disadvantageous influences as a result of inertial effects that occur at higher speeds of the combustion engine can thus be compensated for. Depending on the speed and geometry, points in the vicinity of the big end 3 of the connecting rod reach accelerations of several thousand g.

As can be seen from FIGS. 29, 30 on the one hand and from FIGS. 31, 32 on the other, the hydraulic medium supply channel 13 extends from the connecting-rod bearing 3*b* formed by the big end 3 of the connecting rod. During operation, forces of several thousand times the force of gravity can act on the supply line bores (=hydraulic medium supply channel 13, subchannels 13*a*, 13*b*) in the connecting rod 1. At the same time, forces act on the connecting-rod bearing 3*b* which result from firing and inertial force on a piston fastened to the connecting rod. In order to avoid a disruption of the control of the length adjustment of the connecting rod 1 as a result of these pressure fluctuations in the connecting-rod bearing 3*b* due to inertial forces of the oil column, it is advantageous to make the oil column as short as possible. In order to maintain sufficient bearing capacity of the bearing, it is advantageous if the hydraulic medium supply channel 13 extends from an area of the connecting-rod bearing 3b that is located in a range between a 40° and 320° peripheral angle β of the big end 3 of the connecting rod, with 0° being defined as the intersection point A between the longitudinal axis 1a of the connecting rod 1 and the big end 3 of the connecting rod that is closest to the small end 2 of the connecting rod. Especially favorable results have been observed if the hydraulic medium supply channel 13 extends from the big end 3 of the connecting rod at a peripheral angle β in the range of about 315° (special variant, FIGS. 31 and 32). If the angle α is selected so as to be near 90°, the hydraulic medium supply channel 13 expediently extends at a peripheral angle β in the range from 135° to 225°, ideally 180°. See FIGS. 29 and 30, where the extraction 15 at 180° and (with dashed lines) extractions 15 at 135° and 225° are indicated; extractions therebetween are not drawn in but are possible. Here, the advantages of the extraction arrangement outweigh the disadvantages that arise as a result of the somewhat greater bore lengths (and resulting longer oil columns). That way, disturbances in the operation as a result of pressure-loading by the oil column, particularly in the case of shorter bores, can be minimized. At the same time, bores and material weakening in the bearing shell are avoided in the region between 320° and 40°, which prevents an inadmissible weakening of the bearing capacity of the bearing.

FIG. 33 shows the region of the extraction 15 of the connecting-rod bearing 3b in a section through the crank pin 7a of a crankshaft 7, with the oil bores 38 between main bearing 39 and connecting-rod bearing 3b being indicated.

As can be seen in FIGS. 23 and 28, the control device 16 and connecting element 28 can be embodied collectively as a module 35 and be arranged in a substantially cylindrical housing 36 that is pushed as a unit into a cylindrical cavity 37 of the second rod part 5 in the direction of the longitudinal axis 1a of the connecting rod 1. This facilitates manufacturing.

In FIG. 34, for a combustion engine without application of the present invention, the pressure p16L, p16H in the control device 16 and the design control pressure psL, psH is plotted over the crank angle KW, with "L" standing for low and "H" standing for high control pressure, and with the low design control pressure psL ("low-pressure mode") being associated with a long connecting rod length and the high design control pressure psH ("high-pressure mode") being associated with a short connecting rod length. It can clearly be seen that irregularities occur in regions denoted by K, since the pressures p16H, p16L arising in the control device 16 in the high-pressure mode or in the low-pressure mode lie below and above the respective design control pressures psH and psL. In the depicted example, which shows the pressure profile for a crankshaft speed of about 4000 RPM, this results in uncontrollable behavior on the part of the control device 16.

FIG. 35 shows a pressure profile for a crankshaft speed of over 5000 revolutions per minute (RPM) analogously to FIG. 34, with a connecting rod according to the invention with the described measures for reducing the disruptive influences as a result of the inertial forces at high speeds. It can clearly be seen that the pressures p16H, p16L occurring in the control device 16 in high-pressure mode lie above the high design pressure psH and lie below the low design control pressure psL in low-pressure mode. This ensures that, even at high combustion engine speeds, the controllability of the length adjustment of the connecting rod 1 is not disadvantageously influenced by inertial forces.

The invention thus makes a length-adjustable connecting rod possible that can be reliably and reproducibly adjusted at high speeds while having sufficient bearing capacity and being simple to manufacture.

Additional preferred design variants of the invention are indicated below:

1. A length-adjustable connecting rod 1 for a reciprocating piston engine, with at least one first rod part 4 and one second rod part 5, both of which rod parts 4, 5 can be displaced telescopically toward and/or in one another, wherein one of the two rod parts 5 forms a guide cylinder 8 and the other rod part 4 forms a piston member 6 that can be longitudinally displaced in the guide cylinder 8, wherein a first high-pressure chamber 9 is disposed between a first front side 6a of the plunger element 6 and the guide cylinder 8 and a second high-pressure chamber 10 is disposed between a second front side 6b of the plunger element 6 and the guide cylinder 8, and wherein a first oil passage 11 leads to the first high-pressure chamber 9 and a second oil passage 12 leads to the second high-pressure chamber 10, and the oil passages 11, 12 can be fluidly connected by a control device 16 with at least one oil supply passage 13, characterized in that the control device 16 has a first valve 17 and a second valve 22, each with a valve body 20, 25 that is arranged in a valve chamber 18; 23 and that is pressed by a restorative force against a valve seat 21; 6, wherein a first valve chamber 18 of the first valve 17 is fluidly connected to the first oil passage 11 and a second valve chamber 23 of the second valve 22 is fluidly connected to the second oil passage 12, and the valve bodies 20; 25 are operatively interconnected via a connecting device 16a having at least one connecting element 28 that can be displaced at least between a first position and a second position, and wherein, in the first position, the first valve body 20 and, in the second position, the second valve body 25 can be lifted by the connecting device 16a counter to the restorative force from an associated first and second valve seat 21; 26, respectively, and the corresponding first and second valve chamber 18; 23 are fluidly connected to the oil supply passage 13 and, in the other position, rest on the first and second valve seat 21; 26, respectively, and block the fluid connection to the oil supply passage 13.
2. The connecting rod 1 according to embodiment 1, characterized in that the connecting element 28 is firmly connected to a control plunger 31 that can be displaced in a control cylinder 30 and borders a control chamber 33 into which a control line 34 leads that is preferably fluidly connected to the oil supply passage 13.
3. The connecting rod 1 according to embodiment 1 or 2, characterized in that the valve bodies 20, 25 and the connecting device 16a are separate components, with the connecting device 16a being spaced apart in the first position from the second valve body 25 and, in the second position, from the first valve body 20.
4. The connecting rod 1 according to any of embodiments 1 to 3, characterized in that the connecting element 28 is embodied as an axially displaceable tie rod 29 that is preferably arranged so as to be normal to the longitudinal axis 1a of the connecting rod 1.
5. The connecting rod 1 according to embodiment 4, characterized in that the first lift axis 20a of the first valve body 20 is coaxial with the longitudinal axis 29a of the tie rod 29, with the first valve 17 being arranged in the vicinity of a first end 29c of the tie rod 29.

6. The connecting rod 1 according to embodiment 4 or 5, characterized in that the second lift axis 25*a* of the second valve body 25 is coaxial with the longitudinal axis 29*a* of the tie rod 29, with the second valve 22 being arranged in the vicinity of a second end 29*d* of the tie rod 29, and with the first valve seat 21 of the first valve 17 and the second valve seat 26 of the second valve 22 preferably facing away from one another.

7. The connecting rod 1 according to any one of embodiments 4 to 6, characterized in that the first lift axis 20*a* of the first valve body 20 is arranged so as to be inclined at a first angle α of about 90°+/−60° with respect to the longitudinal axis 29*a* of the tie rod 29.

8. The connecting rod 1 according to embodiment 7, characterized in that at least one preferably rod-shaped first transmission element 39 is arranged so as to be axially displaceable between the first valve body 20 and the tie rod 29, with the first displacement axis 39*a* of the transmission element 39 being especially preferably arranged so as to be coaxial with the first lift axis 20*a* of the first valve body 20.

9. The connecting rod 1 according to any one of embodiments 7 or 8, characterized in that the second lift axis 25*a* of the second valve body 25 is arranged so as to be inclined at a second angle α of about 90°+/−60° with respect to the longitudinal axis 29*a* of the tie rod 29.

10. The connecting rod 1 according to embodiment 9, characterized in that at least one preferably rod-shaped second transmission element 42 can be arranged so as to be axially displaceable between the second valve body 25 and the tie rod 29, with the second displacement axis 42*a* of the second transmission element 42 being preferably arranged so as to be coaxial with the second lift axis 25*a* of the second valve body 22.

11. The connecting rod 1 according to any one of embodiments 8 to 10, characterized in that at least one preferably spherical deflection element 40 is arranged between the first transmission element 39 and the tie rod 29 and/or between the second transmission element 42 and the tie rod 29, with the deflection element 40 being especially preferably arranged in a deviated borehole 41 connecting the receiving holes 29*b*, 39*b*, 42*b* of the tie rod 29 and of the first or second transmission element 39, 42 at an angle β of inclination of greater than 0° in relation thereto.

12. The connecting rod 1 according to any one of embodiments 8 to 11, characterized in that the tie rod 29 acts directly on the first and/or second transmission element 39, 42 in at least one position.

13. The connecting rod 1 according to any one of embodiments 4 to 12, characterized in that at least one end 29*c*, 29*d* of the tie rod 29 is conically or spherically shaped.

14. The connecting rod 1 according to any one of embodiments 8 to 13, characterized in that at least one end of the first and/or second transmission element 39, 42 is conically or spherically shaped.

15. The connecting rod 1 according to any one of embodiments 1 to 14, characterized in that the control cylinder 30 has on its outer periphery an annular space 37 that is preferably formed by a circumferential annular groove 37*a* and fluidly connected to the control chamber 33 or a high-pressure chamber 10.

16. The connecting rod 1 according to any one of embodiments 1 to 15, wherein the control device 16 has at least one part that is mounted so as to be displaceable in the direction of a displacement axis 16*a*, with the displacement axis 16*a* being arranged on an oscillation plane c of the connecting rod 1—preferably normal to the longitudinal axis 1*a* of the connecting rod 1—characterized in that at least one back-and-forth-moving part of the control device 16 has at least one buoyancy body 60, 61 or is embodied at least in part as a buoyancy body 60, 61.

17. The connecting rod 1 according to embodiment 15, characterized in that the buoyancy body 60, 61 has a lesser density than the actuating medium, preferably motor oil.

18. The connecting rod 1 according to embodiment 16 or 17, characterized in that at least one buoyancy body 60, 61 is embodied as a hollow body.

19. The connecting rod 1 according to any one of embodiments 16 to 18, characterized in that at least one buoyancy body 60, 61 is embodied as a closed-cell foam body, preferably made of polystyrene.

20. The connecting rod 1 according to any one of embodiments 16 to 19, characterized in that the buoyancy body 60, 61 is firmly connected to the back-and-forth-moving part or integrally formed therewith.

21. The connecting rod 1 according to any one of embodiments 16 to 20, wherein a back-and-forth-moving part of the control device 16 is formed by a control plunger 31 that is displaceably supported in a control cylinder 30 whose first front side 31*a* borders a control chamber 33 that can be charged with an actuating medium and whose second front side 31*b* borders a spring chamber 32*a* having a return spring 32, characterized in that at least one buoyancy body 60, 61 is arranged in the vicinity of the first front side 31*a* and/or in the vicinity of the second front side 31*b* of the control plunger 31, with the control plunger 31 preferably having defined leakages between the control chamber 33 and the spring chamber 32*a*.

22. The connecting rod 1 according to embodiment 21, characterized in that the spring chamber 32*a* is fluidly connected to a storage chamber 62, with the storage chamber 62 being preferably arranged in the same rod part 4 of the connecting rod 1 as the control device 16.

23. The connecting rod 1 according to embodiment 22, characterized in that the storage chamber 62 is connected via a throttle 63 to a crank chamber.

24. The connecting rod 1 according to any one of embodiments 16 to 23, characterized in that the connecting device 16*a* has at least one buoyancy body or is embodied at least in part as a buoyancy body.

25. The connecting rod 1 according to embodiment 24, characterized in that at least one valve body 20, 25 has at least one buoyancy body or is embodied at least in part as a buoyancy body.

26. The connecting rod 1 according to any one of embodiments 1 to 25, characterized in that the connecting device 16*a* and/or the control plunger 31 has at least one thermocouple 65.

27. The connecting rod 1 according to embodiment 26, characterized in that the connecting element 28 of the connecting device 27 is embodied as an axially displaceable tie rod 29 that is preferably arranged so as to be normal to the longitudinal axis 1*a* of the connecting rod 1 and is divided axially—preferably in the vicinity of the control plunger 31—with the thermocouple 65 being arranged between a first tie rod part 19*a* and a second tie rod part 19*b*, especially preferably between the first tie rod part 19*a* and the control plunger 31.

28. The connecting rod 1 according to any one of embodiments 1 to 16a, characterized in that a spring element 66 that acts toward the connecting rod extension is arranged between the first tie rod part 19*a* and the second tie rod part 19*b*, with the spring element 66 being preferably embodied as a disc spring.
29. The connecting rod 1 according to any one of embodiments 1 to 28, characterized in that at least one first throttle device 71 is arranged in the first oil passage 11 and/or at least one second throttle device 72 is arranged in the second oil passage 12, with the first throttle device 71 and/or the second throttle device 72 being preferably bypassable by means of a first bypass channel 73 or a second bypass channel 74.
30. The connecting rod 1 according to embodiment 29, characterized in that a first bypass valve 75 or second bypass valve 76 that is preferably embodied as a check valve is arranged in the first bypass channel 73 and/or second bypass channel 74.
31. A length-adjustable connecting rod 1 for a reciprocating piston engine, with at least one first rod part 4 having a small end 2 of the connecting rod and a second rod part 5 having a big end 3 of the connecting rod big that can be mounted on a crankshaft, both of which rod parts 4, 5 are displaceable telescopically toward a longitudinal axis 1*a* of the connecting rod 1 and/or in one another by means of a length-adjusting means 64 that can be charged with hydraulic medium, with the hydraulic channels 11, 12 being fluidly connectable by means of a control device 16 to at least one hydraulic medium supply channel 13, characterized in that the control device 16 has a first valve 17 and a second valve 22, each with a valve body 20; 25 arranged in a valve chamber 18; 23, which valve bodies 20; 25 can each be pressed by a restorative force against a respective valve seat 21; 26, wherein a first valve chamber 18 of the first valve 17 is fluidly connected to a first hydraulic channel 11 and a second valve chamber 23 of the second valve 22 is fluidly connected to a second hydraulic channel 12, and the valve bodies 20; 25 are operatively interconnected via a connecting element 28—preferably formed by a tie rod—that can be displaced at least between a first position and a second position along a displacement axis 16*a*, and wherein, in the first position, the first valve body 20 and, in the second position, the second valve body 25 can be lifted by the connecting element 28 counter to the restorative force from the associated first 21 and second valve seat 26, respectively, and the corresponding first 18 and second 23 valve chamber can be fluidly connected to the hydraulic medium supply channel 13 and, in the respective other position, rest on the first 21 valve seat and second valve seat 26, respectively, and block the fluid connection to the hydraulic medium supply channel 13, and that the displacement axis 16*a* spans an angle $\alpha$ with the normal plane $\tau$ with respect to a longitudinal axis 1*a* of the connecting rod 1 for which the following relationship holds: $0° < \alpha <= 90°$.
32. The connecting rod 1 according to embodiment 31, characterized in that the length-adjusting means 64 is embodied such that one of the two rod parts 5 is embodied as a guide body 8 and the other rod part 4 as a plunger element 6 that can be displaced in the guide body 8, wherein a first high-pressure chamber 9 is disposed particularly between a first front side 6*a* of the plunger element 6 and the guide body 8, and a second high-pressure chamber 10 is disposed between a second front side 6*b* of the plunger element 6 and the guide body 8, and wherein a first hydraulic channel 11 leads into the first high-pressure chamber 9, and a second hydraulic channel 12 leads into the second high-pressure chamber 10.
33. The connecting rod 1 according to embodiments 31 or 32, characterized in that the angle $\alpha$ is between 30° and 60°, preferably between 40° and 50°.
34. The connecting rod 1 according to any one of embodiments 31 to 33, characterized in that the displacement axis 16*a* is arranged so as to be parallel to an oil resultant R.
35. The connecting rod 1 according to any one of embodiments 31 to 34, characterized in that the connecting element 28 is securely connected to a control plunger 31 that can be displaced in a control cylinder 30 and borders a control chamber 33 into which a control line 34 leads.
36. The connecting rod 1 according to embodiment 35, characterized in that the control line 34 is fluidly connected to the hydraulic medium supply channel 13.
37. The connecting rod 1 according to any one of embodiments 31 to 36, characterized in that the valve bodies 20, 25 and the connecting element 28 are separate components, with the connecting element 28 being spaced apart in the first position from the second valve body 25 and, in the second position, from the first valve body 20.
38. The connecting rod 1 according to any one of embodiments 31 to 37, characterized in that the first lift axis 20*a* of the first valve body 20 is normal to the displacement axis 16*a* of the connecting element 28 and/or to the longitudinal axis 1*a* of the connecting rod 1, with the first valve 17 being arranged in the vicinity of a first end 28*a* of the connecting element 28.
39. The connecting rod 1 according to any one of embodiments 31 to 38, characterized in that the second lift axis 25*a* of the second valve body 25 is normal to the displacement axis 16*a* of the connecting element 28 and/or to the longitudinal axis 1*a* of the connecting rod 1, with the second valve 22 being arranged in the vicinity of a second end 28*b* of the connecting element 28.
40. The connecting rod 1 according to any one of embodiments 31 to 39, characterized in that the first lift axis 20*a* of the first valve body 20 and/or the second lift axis 25*a* of the second valve body 25 are embodied so as to run parallel to a crankshaft axis.
41. The connecting rod 1 according to any one of embodiments 31 to 40, characterized in that at least one end 28*a*, 28*b* of the connecting element 28 is conically or spherically shaped.
42. The connecting rod 1 according to any one of embodiments 31 to 41, characterized in that the connecting element 28 can be deflected counter to the force of a return spring 32.
43. The connecting rod 1 according to embodiment 42, characterized in that a force component of the restorative force that is aligned parallel to the longitudinal axis 1*a* of the connecting rod 1 acts in the direction of the small end 2 of the connecting rod.
44. The connecting rod 1 according to any one of embodiments 31 to 43, characterized in that the control device, along with valve body and connecting device 16*a*, is embodied as a module 35 and arranged in a housing 36 that can be pushed as a unit into a corresponding cavity 37 in the first 4 or second rod part 5.
45. The connecting rod 1 according to embodiment 44, characterized in that the housing 36 and the cavity 37 are substantially cylindrical.
46. The connecting rod 1 according to any one of embodiments 31 to 45, characterized in that the hydraulic medium supply channel 13 extends from an area of the connecting-rod bearing 3*b* that is located in a range between a 40° and 320°, preferably about 315°, peripheral angle $\beta$ of the big end 3 of the connecting rod, with 0° being defined as the intersection point A between the longitudinal axis 1a of the connecting rod 1 and the big end 3 of the connecting rod that is closest to the small end 2 of the connecting rod.

What is claimed is:

1. A length-adjustable connecting rod for a reciprocating piston engine, the connecting rod comprising a first rod part having a small end and a second rod part having a big end, wherein the two rod parts are displaceable toward and/or in one another in the direction of a longitudinal axis of the connecting rod by means of a length-adjusting means, wherein the length-adjusting means can be charged via at least one hydraulic channel with a hydraulic medium, and wherein the at least one hydraulic channel is fluidly connectable via a control device to at least one hydraulic medium supply channel, wherein the control device has a first valve with a first valve body arranged in a first valve chamber and a second valve with a second valve body arranged in a second valve chamber, wherein it is possible for the first and second valve bodies to be pressed by a restorative force against a first valve seat and a second valve seat respectively, wherein the first valve chamber of the first valve is fluidly connected to a first hydraulic channel and the second valve chamber of the second valve is fluidly connected to a second hydraulic channel, and the first and second valve bodies are operatively interconnected via a connecting device that can be displaced at least between a first position and a second position, wherein, in the first position of the connecting device, the first valve body and, in the second position of the connecting device, the second valve body can be lifted by the connecting device counter to the restorative force from the associated first or second valve seat, respectively, and the corresponding first and second valve chamber can be fluidly connected to the hydraulic medium supply channel and, in the respective other position of the connecting device, the first valve body rests on the first valve seat and the second valve body rests on the second valve seat and blocks the fluid connection to the hydraulic medium supply channel, wherein the connecting device has a connecting element that can be displaced between a first position and a second position, wherein the first valve body and the second valve body are operatively interconnected by means of the connecting element, and wherein the connecting element is connected to a control plunger that can be displaced in a control cylinder and that borders a control chamber into which a control line leads.

2. The connecting rod as set forth in claim 1, wherein the first and second valve bodies and the connecting device are separate components with the connecting device being spaced apart in the first position from the second valve body and, in the second position being spaced apart from the first valve body.

3. The connecting rod as set forth in claim 1, wherein the connecting element is embodied as an axially displaceable tie rod.

4. The connecting rod as set forth in claim 1, wherein the connecting element is embodied as an axially displaceable tie rod that is arranged so as to be normal to the longitudinal axis of the connecting rod.

5. The connecting rod as set forth in claim 1, wherein the connecting element can be displaced along a displacement axis, wherein the displacement axis spans an angle α with the normal plane (τ) with respect to the longitudinal axis of the connecting rod for which the following relationship holds: 0°<α<=90°.

6. The connecting rod as set forth in claim 5, wherein the angle α is between 30° and 60°.

7. The connecting rod as set forth in claim 5, wherein the displacement axis is arranged so as to be parallel to an oil resultant.

8. The connecting rod as set forth in claim 3, wherein a first lift axis of the first valve body is coaxial with a longitudinal axis of the tie rod, with the first valve being arranged in the vicinity of a first end of the tie rod.

9. The connecting rod as set forth in claim 3, wherein a second lift axis of the second valve body is coaxial with a longitudinal axis of the tie rod, wherein the second valve is arranged in the vicinity of a second end of the tie rod, and wherein the first valve seat of the first valve and the second valve seat of the second valve face away from one another.

10. The connecting rod as set forth in claim 8, the first lift axis of the first valve body is arranged so as to be inclined at a first angle (α) of about 90°+/−60° with respect to the longitudinal axis of the tie rod.

11. The connecting rod as set forth in claim 10, wherein at least one rod-shaped first transmission element is arranged so as to be axially displaceable between the first valve body and the tie rod.

12. The connecting rod as set forth in claim 9, wherein the second lift axis of the second valve body is arranged so as to be inclined at a second angle (γ) of about 90°+/−60° with respect to the longitudinal axis of the tie rod.

13. The connecting rod as set forth in claim 12, wherein at least one rod-shaped second transmission element can be arranged so as to be axially displaceable between the second valve body and the tie rod.

14. The connecting rod as set forth in claim 13, wherein at least one spherical deflection element is arranged between the first transmission element and the tie rod and/or between the second transmission element and the tie rod, with the deflection element being arranged in a deviated borehole connecting receiving holes of the tie rod and the first or second transmission element at an angle (β) of inclination of greater than 0° in relation thereto.

15. The connecting rod as set forth in claim 13, wherein the tie rod acts directly on the first or second transmission element in at least one position.

16. The connecting rod as set forth in claim 13, wherein at least one end of the connecting element is conically or spherically shaped and/or at least one end of the first and/or second transmission element is conically or spherically shaped.

17. The connecting rod as set forth in claim 8, wherein the first lift axis of the first valve body is normal to the displacement axis of the connecting element and/or to the longitudinal axis of the connecting rod, with the first valve being arranged in the vicinity of a first end of the connecting element.

18. The connecting rod as set forth in claim 9, wherein the second lift axis of the second valve body is normal to the displacement axis of the connecting element and/or to the longitudinal axis of the connecting rod, with the second valve being arranged in the vicinity of a second end of the connecting element.

19. The connecting rod as set forth in claim 9, wherein the first lift axis of the first valve body and/or the second lift axis of the second valve body are embodied so as to run parallel to a crankshaft axis.

20. The connecting rod as set forth in claim 1, wherein the control cylinder has on its outer periphery an annular space that is formed by a circumferential annular groove and fluidly connected to the control chamber or a high-pressure chamber.

21. The connecting rod as set forth in claim 1, wherein the control device has at least one part that is mounted so as to be displaceable in the direction of a displacement axis, with the displacement axis being arranged on an oscillation plane (c) of the connecting rod, wherein at least one back-and-forth-moving part of the control device has at least one buoyancy body or is embodied at least in part as a buoyancy body.

22. The connecting rod as set forth in claim 21, wherein the back-and-forth-moving part of the control device is formed by a control plunger that is displaceably supported in a control cylinder whose first front side borders a control chamber that can be charged with an actuating medium and whose second front side borders a spring chamber having a return spring, wherein at least one buoyancy body is arranged in the vicinity of the first front side and/or in the vicinity of the second front side of the control plunger.

23. The connecting rod as set forth in claim 22, wherein the spring chamber is fluidly connected to a storage chamber, with the storage chamber being arranged in the same rod part of the connecting rod as the control device.

24. The connecting rod as set forth in claim 1, wherein the connecting device and/or the control plunger has at least one thermocouple.

25. The connecting rod as set forth in claim 3, wherein the tie rod is divided axially with a thermocouple being arranged between a first tie rod part and a second tie rod part.

26. The connecting rod as set forth in claim 1, wherein a spring element that acts toward a connecting rod extension is arranged between the first rod part and the second rod part.

27. A length-adjustable connecting rod for a reciprocating piston engine, the connecting rod comprising a first rod part having a small end and a second rod part having a big end, wherein the two rod parts are displaceable toward and/or in one another in the direction of a longitudinal axis of the connecting rod by means of a length-adjusting means, wherein the length-adjusting means can be charged via at least one hydraulic channel with a hydraulic medium, and wherein the at least one hydraulic channel is fluidly connectable via a control device to at least one hydraulic medium supply channel,
wherein the control device has a first valve with a first valve body that is arranged in a first valve chamber and a second valve with a second valve body that is arranged in a second valve chamber, wherein it is possible for the first and second valve bodies to be pressed by a restorative force against a first valve seat and a second valve seat respectively,
wherein the first valve chamber of the first valve is fluidly connected to a first hydraulic channel and the second valve chamber of the second valve is fluidly connected to a second hydraulic channel, and the first and second valve bodies are operatively interconnected via a connecting device that can be displaced at least between a first position and a second position,
wherein, in the first position of the connecting device, the first valve body and, in the second position of the connecting device, the second valve body can be lifted by the connecting device counter to the restorative force from the associated first or second valve seat, respectively, and the corresponding first and second valve chamber can be fluidly connected to the hydraulic medium supply channel and, in the respective other position of the connecting device, the first valve body rests on the first valve seat and the second valve body rests on the second valve seat and blocks the fluid connection to the hydraulic medium supply channel, and
wherein the valve first and second bodies and the connecting device are separate components with the connecting device being spaced apart in the first position from the second valve body, and in the second position being spaced apart from the first valve body.

28. A length-adjustable connecting rod for a reciprocating piston engine, the connecting rod comprising a first rod part having a small end and a second rod part having a big end, wherein the two rod parts are displaceable toward and/or in one another in the direction of a longitudinal axis of the connecting rod by means of a length-adjusting means, wherein the length-adjusting means can be charged via at least one hydraulic channel with a hydraulic medium, and wherein the at least one hydraulic channel is fluidly connectable via a control device to at least one hydraulic medium supply channel,
wherein the control device has a first valve with a first valve body that is arranged in a first valve chamber and a second valve with a second valve body that is arranged in a second valve chamber, wherein it is possible for the first and second valve bodies to be pressed by a restorative force against a first valve seat and a second valve seat respectively,
wherein the first valve chamber of the first valve is fluidly connected to a first hydraulic channel and the second valve chamber of the second valve is fluidly connected to a second hydraulic channel, and the valve first and second bodies are operatively interconnected via a connecting device that can be displaced at least between a first position and a second position,
wherein, in the first position of the connecting device, the first valve body and, in the second position of the connecting device, the second valve body can be lifted by the connecting device counter to the restorative force from the associated first or second valve seat, respectively, and the corresponding first and second valve chamber can be fluidly connected to the hydraulic medium supply channel and, in the respective other position of the connecting device, the first valve body rests on the first valve seat and the second valve body rests on the second valve seat and blocks the fluid connection to the hydraulic medium supply channel, and
wherein the control device, along with the valve body and the connecting device, is embodied as a module and arranged in a housing that can be pushed as a unit into a corresponding cavity in the first or second rod part.

* * * * *